US008359252B2

(12) United States Patent
Redmayne

(10) Patent No.: US 8,359,252 B2
(45) Date of Patent: Jan. 22, 2013

(54) METHOD AND APPARATUS FOR PRICING SECURITIES

(76) Inventor: John Michael Redmayne, Palmerston North (NZ)

( * ) Notice: Subject to any disclaimer, the term of this patent is extended or adjusted under 35 U.S.C. 154(b) by 1459 days.

(21) Appl. No.: 10/584,826

(22) PCT Filed: Dec. 23, 2004

(86) PCT No.: PCT/NZ2004/000331
§ 371 (c)(1),
(2), (4) Date: Sep. 1, 2006

(87) PCT Pub. No.: WO2005/062224
PCT Pub. Date: Jul. 7, 2005

(65) Prior Publication Data
US 2009/0106133 A1   Apr. 23, 2009

(30) Foreign Application Priority Data

Dec. 24, 2003 (NZ) .................................... 530377

(51) Int. Cl.
*G06Q 40/00* (2012.01)
(52) U.S. Cl. .............................. 705/35; 705/36 R; 705/38
(58) Field of Classification Search .................. 705/35, 705/36 R, 38
See application file for complete search history.

(56) References Cited

U.S. PATENT DOCUMENTS

| | | | | |
|---|---|---|---|---|
| 5,812,988 A | * | 9/1998 | Sandretto | 705/36 R |
| 6,078,903 A | * | 6/2000 | Kealhofer | 705/36 R |
| 6,125,355 A | * | 9/2000 | Bekaert et al. | 705/36 R |
| 6,546,375 B1 | * | 4/2003 | Pang et al. | 705/37 |
| 7,089,207 B1 | * | 8/2006 | Lardy et al. | 705/38 |
| 7,315,838 B2 | * | 1/2008 | Gershon | 705/36 R |
| 7,315,842 B1 | * | 1/2008 | Wang | 705/38 |
| 7,386,466 B2 | * | 6/2008 | McLean et al. | 705/10 |
| 7,389,260 B1 | * | 6/2008 | McLean et al. | 705/36 R |
| 7,752,126 B2 | * | 7/2010 | Wang | 705/38 |
| 7,756,732 B2 | * | 7/2010 | McLean et al. | 705/7 |
| 2001/0011243 A1 | * | 8/2001 | Dembo et al. | 705/36 |
| 2001/0053993 A1 | * | 12/2001 | McLean et al. | 705/10 |
| 2001/0056391 A1 | * | 12/2001 | Schultz | 705/36 |
| 2001/0056392 A1 | | 12/2001 | Daughtery | 705/36 R |
| 2002/0065755 A1 | | 5/2002 | Schlafman et al. | 705/36 R |

(Continued)

FOREIGN PATENT DOCUMENTS

WO    WO 01/52121    7/2001
WO    WO 03/034297   4/2003

(Continued)

OTHER PUBLICATIONS

Arnold, T.M. et al., "Otion Pricing in the Real World: A Generalized Binomial Model with Applications to Real Otpions," Aug. 2000, http://ssrn.com/abstract=240554.

(Continued)

*Primary Examiner* — Kenneth Bartley
(74) *Attorney, Agent, or Firm* — Woodcock Washburn LLP

(57) ABSTRACT

The invention provides computer-implemented techniques and systems for parsimoniously modelling the price or value, expected rate of return or other relevant characteristics of securities issued by, or referenced to, firms (or other assets) by incorporating risk premia such that a range of different securities can be evaluated within a single, unified and coherent framework, thereby leading to significant reduction in the computing resources otherwise required.

126 Claims, 8 Drawing Sheets

U.S. PATENT DOCUMENTS

| | | | | |
|---|---|---|---|---|
| 2002/0178101 | A1 | 11/2002 | Swift | 705/36 R |
| 2002/0184067 | A1* | 12/2002 | McLean et al. | 705/7 |
| 2003/0018506 | A1* | 1/2003 | McLean et al. | 705/7 |
| 2003/0093347 | A1* | 5/2003 | Gray | 705/35 |
| 2003/0110016 | A1* | 6/2003 | Stefek et al. | 703/2 |
| 2003/0139993 | A1* | 7/2003 | Feuerverger | 705/36 |
| 2004/0039673 | A1 | 2/2004 | Amberson et al. | 705/36 R |
| 2004/0064393 | A1* | 4/2004 | Luenberger | 705/36 |
| 2004/0103013 | A1* | 5/2004 | Jameson | 705/7 |
| 2004/0133439 | A1* | 7/2004 | Noetzold et al. | 705/1 |
| 2004/0172352 | A1* | 9/2004 | Deretz | 705/36 |
| 2005/0004854 | A1* | 1/2005 | Jones et al. | 705/35 |
| 2005/0021435 | A1* | 1/2005 | Hakanoglu et al. | 705/36 |
| 2005/0021452 | A1* | 1/2005 | Lipton et al. | 705/38 |
| 2005/0027645 | A1* | 2/2005 | Lui et al. | 705/38 |
| 2005/0033678 | A1* | 2/2005 | Huneault | 705/36 |
| 2005/0080704 | A1* | 4/2005 | Erlach et al. | 705/36 |
| 2005/0187851 | A1* | 8/2005 | Sant | 705/36 |
| 2005/0262014 | A1* | 11/2005 | Fickes | 705/38 |
| 2007/0027786 | A1* | 2/2007 | Lipton et al. | 705/35 |
| 2007/0198387 | A1* | 8/2007 | Uenohara et al. | 705/36 R |
| 2008/0243721 | A1* | 10/2008 | Joao | 705/36 R |

FOREIGN PATENT DOCUMENTS

| | | |
|---|---|---|
| WO | WO 03/107137 | 12/2003 |
| WO | WO 2004/066102 | 8/2004 |

OTHER PUBLICATIONS

Black, F. et al., "Valuing Corporate Securities: Some Effects of Bond Indenture Provisions," *Journal of Finance*, 1976, 31(2), 351-367.

Chang, J.S.K. et al., "Option Pricing and the Arbitrage Pricing Theory," *Journal of Financial Research*, 1987, 10(1), 1-16.

Chen, R. et al., "What is behind the Smile? Transaction Costs or Fat Tails," working paper in progress, Rutgers Business School, Rutgers University, 2003.

Cooper, I. et al., "The Cost of Debt," *Institute of Finance and Accounting Working Paper 323*, London Business School, 2001, 1-16.

Duffie, D. et al., "Term Structures of Credit of Credit Spreads with Incomplete Accounting Information," *Econometrica*, 2001, 69(3), 633-664.

Dumas, B. et al., "Implied Volatility Functions: Empirical Tests," *Journal of Finance*, 1998, 53(6), 2059-2106.

Galai, D. et al., "The Option Pricing Model and the Risk Factor of Stock," *Journal of Financial Economics*, 1976, 3, 53-81.

Giesecke, K., "Correlated Defaults, Incomplete Information and the Term Structure of Credit Spreads," Dissertation, Humboldt University Berlin, 2001, http://www.edoc.hu-berlin.de/dissertationen/giesecke-kay-2001-07-20/PDF/Giesecke.pdf.

Hsia, C., "Estimating a Firm's Cost of Capital: An Option Pricing Approach," *Journal of Business Finance & Accounting*, 1991, 18(2), 281-287.

Huang, T. et al., "Portfolio Optimisation with Options in the Foreign Exchange Market," *Derivatives Use, Trading & Regulation*, 2001, 7(1), 55-72.

Jarrrow, R.A. et al., "Is Mean-Variance Analysis Vacuous: Or was Beta Still Born?" *European Finance Review*, 1997, 1, 15-30.

Lee, W.Y. et al., "Option Pricing in a Lognormal Securities Market with Discrete Trading," *Journal of Financial Economics*, 1981, 9, 75-101.

Samuelson, P.A., "Rational Theory of Warrant Pricing," *Industrial Management Review*, 1965, 6(2), 13-32.

Zhou, C., "The Term Structure of Credit Spreads with Jump Risk," *Journal of Banking & Finance*, 2001, 25, 2015-2040.

Brealey and Myers (Eds.), "Principles of Corporate Finance", Mcgraw-Hill Book Company, New York, 1981, pp. 127 and 440.

Chance (Ed.), "An Introduction to Derivates", Third Edition, Harcourt Brace College Publishers, Nov. 1994, Chapter 1, p. 7.

Elton and Gruber (Eds.), "Modern Portfolio Theory and Investment Analysis", Fifth Edition, John Wiley & Sons, New York, 1995, Chapter 13, p. 301 and Chapter 22, p. 589.

Hull (Ed.), "Opinions, Futures and other Derivatives", Fifth Edition, Prentice Hall, 2002, Chapter 12, pp. 244 and 245.

\* cited by examiner

Illustrative option valuation analysis known in the art

Illustrative equity valuation analysis known in the art

Illustrative debt valuation analysis known in the art

Illustrative embodiment of the invention

METHOD AND APPARATUS FOR PRICING SECURITIES

CROSS REFERENCE TO RELATED APPLICATIONS

This application is the National Phase of International Application No. PCT/NZ2004/000331, filed Dec. 23, 2004, which claims the benefit of New Zealand Patent Application No. 530377, filed Dec. 24, 2003, the disclosures of which are incorporated herein by reference in their entirety.

FIELD OF THE INVENTION

The invention relates generally to the efficient computer processing of financial data. More particularly, the invention relates to computer implemented techniques for parsimoniously modelling the price (or value), expected rate of return or other relevant characteristics of securities issued by, or referenced to, firms (or other assets) by incorporating risk premia such that a range of different securities can be evaluated within a single, unified and coherent framework, thereby leading to significant reduction in the computing resources otherwise required.

BACKGROUND OF THE INVENTION

Currently many financial institutions and investors use a range of completely different computer models and systems to analyse and evaluate different types of assets or securities. (Assets or securities are defined herein in the broadest possible terms, including, for example; shares, bonds, convertible instruments, call options, put options, futures, swaps, credit default swaps, other derivatives, other financial contracts, real assets, financial assets, liabilities, indices, commodities etc. Similarly references to securities issued by, or referenced to, a firm also refers to securities issued by, or referenced to, any other underlying asset.) Not only is the efficacy of many of these models in doubt (for example, the empirical performance of the Capital Asset Pricing Model and the Black-Scholes option pricing model have both been critiqued in numerous studies), but significant computing resources are also required to run multiple models.

Furthermore, not only are different models currently used for different types of assets, but multiple models are often required for the same asset type. For example, after fitting the Black-Scholes option pricing model to observed option prices, by way of solving for the implied volatilities, a second model is then typically required to model the resulting three dimensional implied volatility surface in order to price other options that might be written on the same underlying asset (see, for example, the volatility surface fitting procedure described in Dumas, B., Fleming, J. and Whaley, R. E. Journal of Finance, Implied Volatility Functions: Empirical Tests, 1998, 53(6), 2059-2106, and FIG. 1). In the case of this example, a single option pricing model that could parsimoniously fit option prices to observed market prices (i.e. explain the Black-Scholes implied volatility surface) would eliminate the need to run the second model with consequential savings in the required computer resources, a reduction in the possibility of modelling errors and faster processing times. In a real-time trading environment the latter two technical effects are particularly important.

In the case of equity securities (for example, stocks or shares) a range of models are typically used in their analysis. These models include the Capital Asset Pricing Model, shown in FIG. 2, the Fama-French three factor model and the Arbitrage Pricing Theory. While in the case of debt-type securities a different suite of models is typically applied. For example, the Merton option-theoretic model or the reduced form model. In the case of the Merton option-theoretic model, applied in a risk neutral world, it is known in the art that the resulting probability of default estimates are not "real world" estimates. Hence a second model is then typically required to "map" the risk neutral default probability estimates to real world default probabilities, as shown in FIG. 3 and as, for example, applied by commercial service provider Moodys KMV.

The invention introduces the use of risk adjusted discount rates, incorporating a risk premium or premia, into the modelling of security or asset prices or values. In the case of option pricing, the calculation of a single risk adjusted discount rate to value an option has widely been considered to be extremely difficult, if not impossible.

The risk adjusted discounting approach to valuing options was recognised by Nobel Prize winning economist Samuelson (in Samuelson, P. A. Rational Theory of Warrant Pricing, Industrial Management Review, 1965, 6(2), 13-32), who allowed for a risk adjusted rate of return on the underlying asset ($\alpha$) and a different risk adjusted rate of return on the option ($\beta$) but he did " . . . not pretend to give a theory from which one can deduce the relative values of $\alpha$ and $\beta$" (pp. 19-20).

Economists Merton and Scholes received Nobel Prizes for their work in pricing options in a risk neutral framework. The press release at the time of their award noted the difficulty in trying to apply a risk premium approach:

"The value of an option to buy or sell a share depends on the uncertain development of the share price to the date of maturity. It is therefore natural to suppose—as did earlier researchers—that valuation of an option requires taking a stance on which risk premium to use, in the same way as one has to determine which risk premium to use when calculating present values in the evaluation of a future physical investment project with uncertain returns. Assigning a risk premium is difficult, however, in that the correct risk premium depends on the investor's attitude towards risk. Whereas the attitude towards risk can be strictly defined in theory, it is hard or impossible to observe in reality." (http://nobelprize.org/economics/laureates/1997/press.html)

While the general concept of equating the price of risk across different securities is known in the art, to date the focus has been on pricing exposure to economy-wide or state variables (e.g. the stock market, GDP growth, oil prices etc.). Furthermore, the traditional view has been that the risk premium implicit in the expected returns on debt-type securities is related to factors such as liquidity or taxes, on the basis that there is little, if any, non-diversifiable residual risk exposure from investing in corporate bonds. Models that have attempted to relate the risk/return of the firm's debt and equity securities typically require additional computing resources and/or have been poorly specified through, for example, mixing instantaneous measures of volatility with discrete time measures of return. For example, the focus of the prior art in this area has been on analysis of instantaneous relationships of securities' risk and return using the first derivatives of pricing model equations, typically applied under risk neutral pricing assumptions. As noted by Galai and Masulis (in Galai, D. and Masulis, R. W. The Option Pricing Model and the Risk Factor of Stock, Journal of Financial Economics, 1976, 3, 53-81) a problem with using instantaneous measures of the volatility of securities in an option-theoretic model of the firm is that such volatility measures are not stationary through time (i.e. through the life of the "option"). The shortcomings of the prior art are solved in preferred embodiments of the invention.

In summary, while there have been attempts to introduce a coherent framework for analysing different types of securities, or assets, to date none have been able to achieve a parsimonious and efficacious approach that results in a reduction in the databases, models and computing resources required by users.

LIMITED COPYRIGHT WAIVER

A portion of the disclosure of this patent document contains material to which a claim of copyright protection is made. The copyright owner has no objection to the facsimile reproduction by anyone of the patent document or the patent disclosure, but reserves all other rights whatsoever. In particular the claim of copyright protection extends to the novel formulae set out in the Description and in the Claims.

SUMMARY OF INVENTION

The invention relates generally to the efficient computer processing of financial data. More particularly, the invention relates to computer implemented techniques for parsimoniously modelling the price (or value), expected rate of return or other relevant characteristics of securities issued by, or referenced to, firms (or other assets) by incorporating risk premia such that a range of different securities can be evaluated within a single, unified and coherent framework, thereby leading to significant reduction in the computing resources otherwise required.

This technical effect will be readily apparent to one with ordinary skill in the art, although it may be less apparent to the lay person on initial perusal of the claims contained herein. FIGS. 1, 2 and 3 illustrate the plurality of models and data inputs typically required to analyse the value of equity, debt and option securities issued by, or referenced to, a single firm using technology known in the art. FIG. 4 illustrates how, when using a preferred embodiment of the invention, less data sources and only a single model are required to parsimoniously analyse the value of the same three different security types (equity, debt and options).

The broad concept of the invention is that two or more securities issued by, or reference to, a firm (or other asset) share exposure to the same underlying sources of risk and the price of these priced risk factors can be analysed at the firm (or asset) specific level. For example, economy-wide or state price variables that may affect the volatility of the firm's underlying assets are premised to have a "proportional" effect on the volatility and other higher moments of the expected returns of all of the securities issued by, or referenced to, that same firm (or other underlying asset)—with that "proportional" effect being analysed by applying an appropriate model. In particular, in the case of the price of the risk of volatility of expected returns, measured over discrete time, the price of risk (i.e. the volatility risk premium) is the same for all firm (or asset) specific securities. Moreover, in the case of debt-type securities the promised yield spread is analysed as comprising at least an expected default loss component and an expected risk premium (or premia) component.

For the purpose of the invention described herein returns can be measured gross or net of taxes and, if specified by the user, be adjusted to remove the influence of other factors, such as changes in interest rates.

In one embodiment a computer is used to process information on the volatility and correlation of two or more securities issued by, or referenced to, the firm to generate estimates of the expected default loss and the expected rate of return on the said securities. Another embodiment of the invention is to incorporate risk premia and the risk premia relationship into computer implemented option pricing models. A further embodiment is to incorporate the risk premia and the risk premia relationship into a computer implemented option-theoretic model of the firm. Various embodiments, for example for different types of security, are able to be integrated in a parsimonious way to achieve savings (by comparison with other existing methods and systems) in the computer resources required to coherently model a diverse range of securities.

BRIEF DESCRIPTION OF THE DRAWINGS

Many advantages, features and applications of the invention will be apparent from the following detailed description of the invention which is provided in connection with the accompanying drawings in which.

DETAILED DESCRIPTION OF INVENTION

The method and apparatus comprises a number of steps carried out by a computer. Several of these steps are novel and their application results in commercially useful, unified models. A key benefit is that the use of a single, unified and coherent approach leads to reductions in the amount of data and range of different models required in order to analyse different securities or assets. These reductions can provide significant savings in terms of the computer resources required by users. Particular embodiments of the invention are also provided.

Preferred embodiments and applications of the invention will now be described with reference to FIGS. 5 to 9. Other embodiments may be realised and structural or logical changes may be made to the disclosed embodiments without departing from the spirit or scope of the invention.

Figure 5:
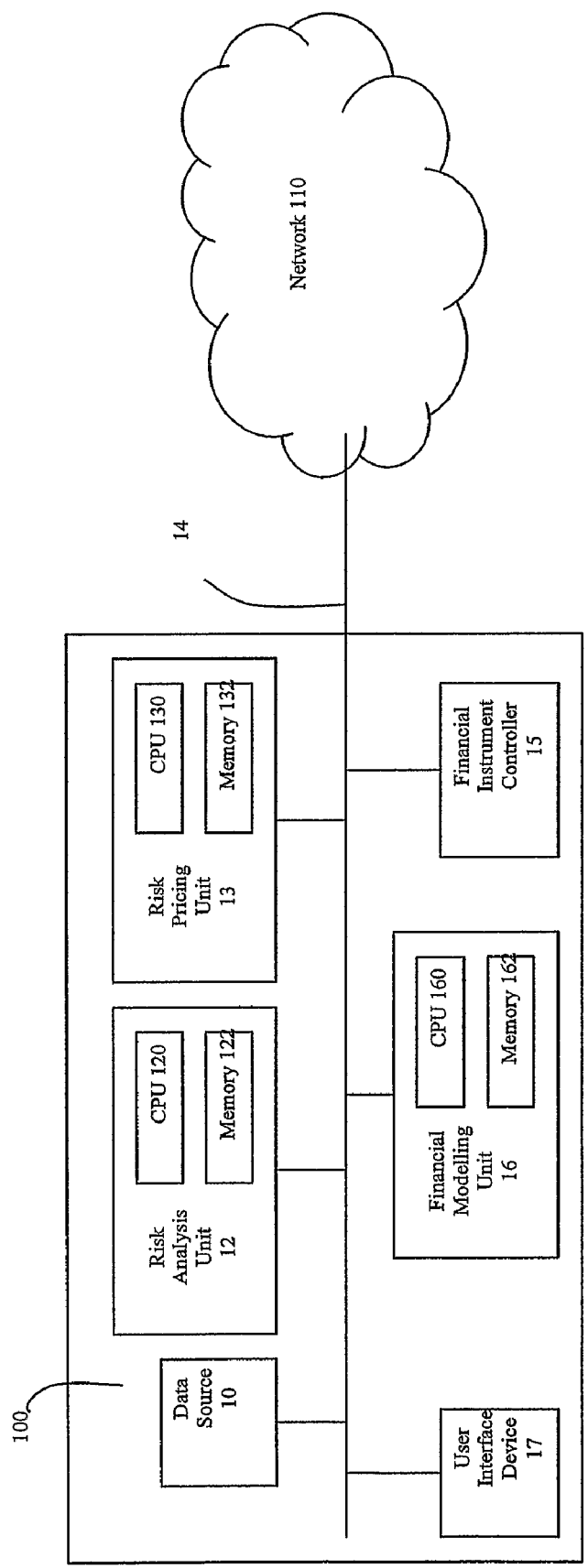
FIG. 5 is a block diagram of a computer apparatus in accordance with a preferred embodiment of the invention.
Figure 6:
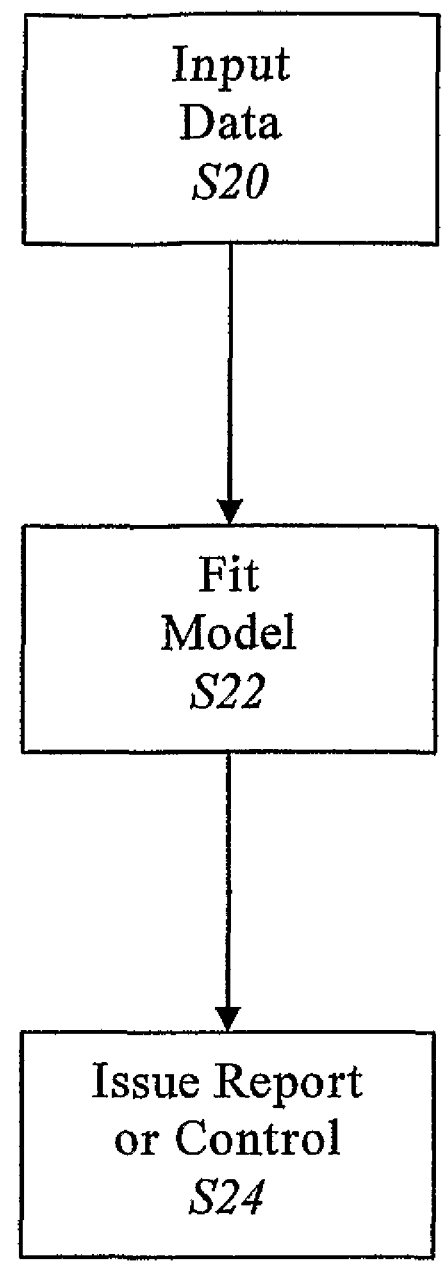
FIG. 6 illustrates a flow chart that describes the operational flow of a preferred embodiment of the invention.
Figure 7:
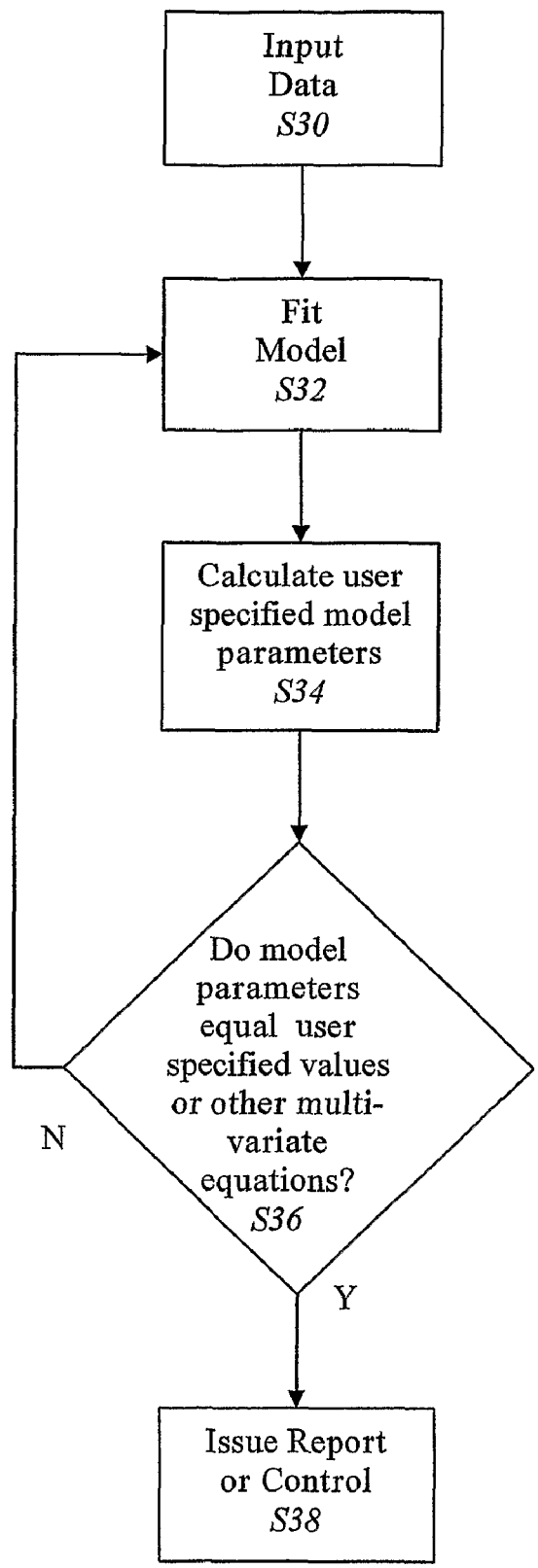
FIG. 7 illustrates a flow chart that describes the operational flow of a preferred embodiment of the invention that employs user specified values or additional multi-variate equations to fit the model being used.

In a preferred embodiment, the invention is implemented in a financial instrument engine 100, as shown in FIG. 5, used to analyse financial and economic signals provided by the financial markets and, based upon user input data and commands, issue position statements or reports for use by the user (or other components or systems), as well as issuing control signals for use by automated systems to effect positions (e.g., increase, decrease, change, etc.) held by the user in the financial markets. The financial engine 100 may be a stand-alone computer hardware system, incorporated in (or distributed among) one or more locally or remotely located computer systems.

In a preferred embodiment, financial engine 100 is composed of a plurality of modules: data source 10, risk analysis unit 12, risk pricing unit 13, financial instrument controller 15, financial modelling unit 16, and user interface device 17. In the illustrated embodiment, the modules are connected by a single transmission bus 14. (It should be understood that the illustration of bus 14 is merely representative of the various connectivity technologies available to those of ordinary skill in the art including single/multiple, wired, wireless, fibre optic and other transmission mediums.)

In a preferred embodiment, data source 10 is used to provide external financial and economic data, signals, or other information to financial engine 100. Data source 10 may include one or more transmission links or connections (wired, wireless, etc.) to a variety of automatic quotation systems/services that provide current market data, and may also include its own information retrieval system(s). The information received by data source 10 is forwarded to one or more of the other modules depending on the particular information provided. Risk analysis unit 12, which may be implemented using a computer program or algorithm executed by central processing unit (CPU) 120, and stored in memory 122, is used to calculate the risk attributes, or exposure to each priced risk factor, (e.g. volatility etc.) of each security or asset being analysed. Risk pricing unit 13, which may be implemented using a computer program or algorithm executed by central processing unit (CPU) 130, and stored in memory 132, is used to calculate the firm, or underlying asset, specific price of each priced risk factor. It will be appreciated that the various modules depicted in the financial engine 100 in FIG. 5 may be integrated into a single module, or be configured as a greater number of sub-modules.

Financial modelling unit 16, which may also be implemented using a computer program or algorithm (described below) stored in memory 162 and executed by CPU 160, receives information from data source 10, risk analysis unit 12, risk pricing unit 13, and user interface device 17 to determine the price or value of each security or asset being analysed and/or such other parameters that are specified by the user. Financial modelling unit 16 may, for example, interact iteratively with these other units in order to converge on an acceptable solution. User interface device 17 is used to exchange information between the user and financial engine 100. Depending on the commands to be implemented (e.g., price or value calculation, implied risk premium calculation, implied volatility calculation, hedge ratio calculation, expected default loss calculation, default probability calculation etc.), the information may include the observed market price of the underlying asset, model derived values, risk premia, volatility, interest rate (e.g., risk-free), maturity (e.g., expiration date), strike price, dividend yield, and other pertinent information. (This information may also be provided by (or output to) data source 10.)

Financial instrument controller 15 may exchange information from all of the modules in financial engine 100. Based on the information provided, financial instrument controller 15 can provide statements and reports to the user (e.g., containing pricing, volatility, position information, etc.) or to others through network 110, as well as provide a host of services based on the information such as controlling trading or allocation of funds in securities, identification of over or under valued securities, simulating market reactions based on input conditions, through signals output to network 110. (The depiction of network 110 is made to represent a variety of known networks and connected systems such as local or wide area networks, e.g., as a company intranet, virtual private networks, telecommunications networks, data networks, the Internet, electronic communications network (ECNs), small order exchange systems (SOES), on-line brokers, other trading networks, etc. Networks and connected systems are defined herein in the broadest terms, to include, for example, temporary (e.g. dial up) or permanent connections, including within organisations, via intermediaries, with external users, suppliers, customers etc. Signals may also be transferred between computers and/or networks using, for example, non-volatile storage devices (e.g. CD, DVD etc.), in which case the receiving computers and/or networks are still considered to be part of network 110.)

The user can input data or parameters (S20 and S30) they specify to the computer implemented models discussed herein and then fit or solve the models (S22 and S32) for unknown parameters of interest. Fitting or solving may involve an exact mathematical solution, minimisation of an error term or penalty function specified by a user or optimising for some objective function specified by a user. Furthermore, "fitting" may involve input of market prices for securities or assets to the computer implemented models, running the models with other user specified or model derived parameters (e.g. for expected risk and return attributes) and then identifying those securities or assets that are considered to be over or under valued (i.e. under this mode of operation the models would not necessarily be solved to explicitly equate the price of risk for each priced factor, but rather the method of the invention is applied to identify securities or assets that have high or low expected risk premia vis-à-vis their risk attributes and are hence considered to be mis-priced in the market). Similarly, "equating" values to fit a model may involve approximate rather than precise solutions. Where necessary, the user may use the model to generate specified parameters for use in fitting the model (S34) and compare these with user specified values or other multi-variate equations (S36), then iterate (or otherwise solve) until the model is satisfactorily fitted. (As will be appreciated by those with ordinary skill in the art a range of mathematical techniques may be used to fit the models of the invention.) Once the model is fitted the financial engine (100) can output a report to the user, for example, user interface device 17, or via network 110. The model output may also be used in effecting trading by issuing control signals etc. through financial instrument controller 15 or the like (step S24 and S38) to trading (or other) systems (represented by network 110) based on the calculations made in steps S22 and S32.

While various computer implemented embodiments of the invention use discrete time measures of volatility (and other higher moments selected by the user) in pricing models and multi-variate equations, it is noted that for the purpose of fitting such models and multi-variate equations to current (or near current) observed or expected values of these parameters instantaneous measures of the said parameters can be extracted from said models and multi-variate equations (S34).

As will be appreciated by those with ordinary skill in the art the claims of the invention can be applied as a new standalone model(s) or by way of modelling correction terms, formulae or adjustments to apply to existing models known in the art.

In one preferred computer implemented embodiment of the invention the expected risk premia on two or more securities issued by, or referenced to, a firm (or other asset) are related to each other by designating that for each priced risk factor the price per unit of risk is the same for all such securities. In particular, in the case of the price of the risk of volatility of expected returns, measured over discrete time, the price of risk (i.e. the volatility risk premium) is the same for all firm (or asset) specific securities. Moreover, in the case of debt-type securities the promised yield spread is analysed as an expected default loss component and an expected risk premium (or premia) component. In this embodiment the expected rate of return for a security (or securities) issued by, or referenced to, a firm is analysed utilising an estimate of the annualised expected default loss ($EDL_j$) of another, debt-type, security (security j) issued by, or referenced to, the firm. The following modelling relationships and/or steps are applied in a computer implemented model:

1. determine the expected rate of return on security j ($r_j$) by reference to the promised yield on said security ($y_j$) and the expected default loss on said security where:

$$r_j = y_j - EDL_j \quad (1)$$

2. calculate the expected excess return for security j as equal to $r_j - r$, where r is the risk free rate of return;
3. calculate the exposure of each security to each priced risk factor (m);
4. calculate a price per unit of risk ($\lambda_m$) for each priced risk factor (m) in which each $\lambda_m$ is the same for two or more securities issued by, or referenced to, the firm and such that the product of the risk exposures and prices per unit of risk for security j equals or approximates the expected excess return for security j (and similarly for any other security for which an estimate of the expected excess return is available);
5. designate that one of the $\lambda_m$'s relates to the volatility of the expected rate of return on securities estimated over a discrete time period and is specific to two or more of the securities issued by, or referenced to, the firm;
6. calculate the excess rate of return for all of the other securities being analysed, other than j, based at least partly on their expected exposure to each priced risk factor and the price per unit of risk (the $\lambda_m$'s); and
7. fit or solve the model.

Once the model has been fitted or solved parameters of interest to the user can then be included in a report output to the user via, for example, user interface device 17, or via network 110 (in step S24 or S38). These parameters may include the risk exposure of each security to each risk factor, the price (per unit of risk) for the priced risk factors, the expected rate of return of each security, the volatility of each security, the expected default loss of debt-type securities, the probability of default, the expected loss given default, the price or values or securities, additional calculations based on the calculated data (e.g., positions taken, projected, predicted, simulated, etc.), hedge ratios and other pertinent data. The calculated parameters and pricing information may also be used in effecting trading by issuing control signals through financial instrument controller 15 or the like (step S24 or S38) to trading systems (represented by network 110) based on the calculations made in steps S22, S32 and S34.

In another preferred computer implemented embodiment of the invention the only priced risk factor comprises the volatility of returns, in which case the following modelling relationships and/or steps are applied in a computer implemented model:

1. designate the firm specific price of volatility risk ($\lambda_\sigma$), the volatility of returns for j ($\sigma_j$) and the risk free rate of return (r) as:

$$\lambda_\sigma = \frac{r_j - r}{\sigma_j} \quad (2)$$

2. designate the expected rate of return ($r_k$) on another class, or classes, of security (k) issued by, or referenced to, the firm as:

$$r_k = r + \lambda_\sigma \sigma_k \quad (3)$$

3. designate, where security class or classes k are debt securities, the expected default loss on said securities by combining the promised yield on said securities ($y_k$) and their expected return ($r_k$) as follows:

$$EDL_k = y_k - r_k \quad (4)$$

4. solve or fit the model.

Again once the model has been fitted or solved parameters of interest to the user can then be included in a report output to the user via, for example, user interface device 17, or via network 110 (in step S24 or S38). The calculated parameters and pricing information may also be used in effecting trading by issuing control signals through financial instrument controller 15 or the like (step S24 or S38) to trading systems (represented by network 110) based on the calculations made in steps S22, S32 and S34.

A further preferred computer implemented embodiment of the invention utilises a novel and original method for using computer generated information on the covariance of returns for two different securities or assets selected by the user as an estimate of the expected default loss of one of the assets, or as a measure of credit risk. This embodiment of the invention allows the expected default loss on a debt security, or a more general indicator of credit quality, to be estimated, for example, from time series of traded security or asset prices. Where an estimate of expected default loss has been derived for a debt-type security, this can then be used to separate out the expected risk premium component of that security's promised yield spread and thus these particular embodiments of the invention provide a key and integral part for implementing the remainder of the overall invention in many circumstances.

Another preferred computer implemented embodiment of the invention utilises a novel and original method for using computer generated information on the variance of returns for two different securities selected by the user and the expected default loss on one of the said securities (which ranks higher in terms of priority upon a liquidation or default event) to estimate of the expected correlation of returns between that pair of securities. This provides a method for estimating said correlation for use in portfolio management decisions or as an additional parameter for fitting other embodiments of the invention.

Further preferred computer implemented embodiments of the invention with application to particular types or combinations of securities are described below.

Preferred Embodiments of the Model of the Invention with Application to Direct Estimation of the Expected Default Loss on Debt-Type Securities In a preferred embodiment of the invention a computer generated estimate of the covariance of returns for two securities issued by, or referenced to, the same firm can be output as a direct estimate of the expected default loss of the security that would rank highest under a liquidation or other default event. The use of covariance for this purpose is not previously known in the art. (Preferably, but not essentially, the two securities concerned are adjacent to each other in terms of their ranking under a liquidation or other default event.)

In another preferred embodiment of the invention a computer generated estimate of the covariance of returns of two portfolios or indices can be output for use as a measure of credit quality (but not necessarily as a precise estimate of expected default loss). For example, the covariance of a corporate bond index with a stock market index can be used as a general indicator of the credit risk or quality of the corporate bond market. As it can be appreciated by one with ordinary skill in the art a time series analysis of such an indicator of credit quality would be of tangible benefit for users such as commercial banks, economists and regulators.

The computer generated estimates of covariance used in the invention can of course be calculated over any time period, using any methodology or weighting scheme specified by the user or, indeed, be a forecast of covariance estimated using tools known to those with ordinary skill in the art, such as GARCH modelling.

A Preferred Embodiment of the Model of the Invention with Application to a Firm with at Least One Type of Debt Security on Issue The steps of a preferred form of this embodiment of the computer implemented invention are as follows:
1. Relate the volatility and correlation of returns of securities issued by, or referenced to, the firm to the expected default loss of one of the said securities (security j), wherein the annualised expected default loss on security j ($EDL_j$) is designated as:

$$EDL_j = \ln(\rho_{jk}\sqrt{(e^{\sigma_j^2 T}-1)(e^{\sigma_k^2 T}-1)}+1)/T \quad (5)$$

where:
j is the class or classes of the firm's debt or similar securities issued by, or referenced to, the firm for which the expected default loss is being estimated
k is the class or classes of security issued by, or referenced to, the firm that rank behind security/in terms of priority upon a liquidation or default event
T is the time horizon of interest to the user, in years
$\sigma_j$ is the standard deviation of rates of return, per annum, on j
$\sigma_k$ is the standard deviation of rates of return, per annum, on k
$\rho_{jk}$ is the correlation coefficient of the rates of return for j and k.
2. Determine the annualised expected rate of return on security j ($r_j$) by reference to the annualised promised yield on said security ($y_j$) and the annualised expected default loss on said security, as designated above, where:

$$r_j = y_j - EDL_j \quad (6)$$

3. The firm specific price of volatility risk ($\lambda_\sigma$) is then designated using the above parameters and the risk free rate of return (r) as follows:

$$\lambda_\sigma = \frac{r_j - r}{\sigma_j} \quad (7)$$

4. The expected rate of return on security class or classes k ($r_k$) is then designated as follows:

$$r_k = r + \lambda_\sigma \sigma_k \quad (8)$$

5. Where security class or classes k are debt securities, the expected default loss on said securities is then designated by combining the promised yield on said securities ($y_k$) and their expected return ($r_k$) as follows:

$$EDL_k = y_k - r_k \quad (9)$$

6. The user then fits or solves the model or models in order to output estimates of the value or values of previously unknown parameters.

In another preferred form of this embodiment of the computer implemented invention the expected default loss of security j (in place of step L above) is simply designated as:

$$EDL_j = \rho_{jk}\sigma_j\sigma_k \quad (10)$$

It will be appreciated by those will ordinary skill in the art that the above procedure can be applied to more than one pair of securities issued by, or referenced to, the same firm and thus provide a basis for deriving the expected distribution of the firm's underlying asset value.

Preferred Embodiments of the Model of the Invention With Application to Estimation of the Correlation of a Firm's Securities In a further preferred embodiment of the invention a computer generated estimate of the variance of returns for two securities issued by, or referenced to, the same firm, together with an estimate of the expected default loss of the security that would rank highest under a liquidation or other default event are combined in a novel way in order to estimate the expected correlation of returns between said pair of securities. The estimation of correlation by this method is not previously known in the art. (Preferably, but not essentially, the two securities concerned are adjacent to each other in terms of their ranking under a liquidation or other default event.)

In a preferred form of this embodiment of the computer implemented invention the volatility of a pair of securities issued by, or referenced to, the firm and the expected default loss on one of the said securities are related to the expected correlation of said pair of securities (securities j and k), wherein the correlation of the expected returns for securities j and k ($\rho_{jk}$) is designated as:

$$\rho_{jk} = (e^{EDL_j T}-1)/\sqrt{(e^{\sigma_j^2 T}-1)(e^{\sigma_k^2 T}-1)} \quad (11)$$

where:
j is the class or classes of the firm's debt or similar securities issued by, or referenced to, the firm for which an estimate of the expected default loss is known
k is the class or classes of security issued by, or referenced to, the firm that rank behind security j in terms of priority upon a liquidation or default event
T is the time horizon of interest to the user, in years
$\sigma_j$ is the standard deviation of rates of return, per annum, on j
$\sigma_k$ is the standard deviation of rates of return, per annum, on k
$EDL_j$ the annualised expected default loss on security j.

In another preferred form of this embodiment of the computer implemented invention the correlation of the expected returns for said securities j and k ($\rho_{jk}$) is simply designated as:

$$\rho_{jk} = EDL_j/\sigma_j\sigma_k \quad (12)$$

A Preferred Embodiment of the Model of the Invention With Application to Analysing Options The steps of a preferred form of this embodiment of the computer implemented invention, for analysing options, are as follows:

1. Specify a return process for the value of the underlying asset upon which the option (or options) is written, using real world (as opposed to "risk neutral world") parameters. The return process can include a defined statistical distribution (e.g. the normal distribution often used in financial models—in which case terminal asset values are assumed to be lognormally distributed), be based on an empirical distribution or such other process specified by the user. In statistical terms the distribution of asset returns from the specified process may include or accord with user defined attributes such as jumps, skewness and kurtosis. Furthermore, the return process may be a function of several factors or processes, including, for example, stochastic volatility, stochastic interest rates and/or incorporate allowance for taxes and income distributions etc.
2. Specify the pay-off structure for the options written on the underlying asset. The pay-off structure is related to an exercise threshold, which may be a value, be modelled as a process specified by the user or be endogenous to the model.
3. Given 1. and 2. above the following can be defined (for example, depending upon the complexity of the model, by closed-form formula):
   (a) The expected mean pay-off of each option written on the underlying asset;
   (b) The expected volatility of each option written on the underlying asset;
   (c) Any higher statistical moments or statistical attributes of interest to the user of each option written on the underlying asset (for example; skewness, co-skewness, kurtosis, co-kurtosis, jump risk) etc.;
   (d) The correlation and/or covariance of expected returns between pairs of options written on the underlying asset;
   (e) The correlation and/or covariance of expected returns between each option and the underlying asset.
4. The value of each option at the beginning of the period of interest is related to the expected value of that option at the end of the period of interest by a discount rate (or expected rate of return) specific to that option. And the value of the underlying asset at the beginning of the period of interest is related to the value of the underlying asset at the end of the period of interest by a discount rate (or expected rate of return) specific to the underlying asset.
5. The discount rate for each of the options and the underlying asset comprises the sum of a risk free rate of return and a risk premium for each risk factor that is being priced in the model (for example, in a basic implementation the only priced risk factor would be the volatility, i.e. standard deviation, of expected returns measured over a discrete time period). For each option and the underlying asset each risk premium (for each priced risk factor) is the product of the said option's or the underlying asset's, as the case may be, exposure or sensitivity to that risk factor and a price for that risk factor. In the case of the volatility of expected returns (and any higher statistical moments thereof), measured in discrete time, the price of each such risk factor is the same for all options and the underlying asset upon which said options are written.

In its simplest form only one risk factor is priced, the volatility of each option and of the underlying asset's expected returns, measured over discrete time. In more complex specifications of the model one or more additional risk factors are priced, including (but not limited to); skewness, kurtosis, other higher statistical moments, jumps, volatility of volatility, interest rate risk factors, liquidity and size.

The invention differs from other models known in the art, such as the Capital Asset Pricing Model and the Arbitrage Pricing Theory, which latter models include a market-wide price of risk. The latter models are not based on underlying asset specific measures of total risk, but rather are implemented by only pricing the systematic or market correlated element of risk or risks.

6. Given the framework described above, the model can be solved (S22 or S32) for one or more unknown parameters using standard mathematical tools. The fundamental valuation principle in 4. and 5. above provides conditions the model should satisfy for each option written on the same underlying asset and for that underlying asset. If too many model input parameters are unknown, to be able to satisfactorily solve the model, then one manner in which the plurality of unknown input parameters can be solved is by specifying additional conditions, such that one or more of the model outputs (for example, the statistical attributes of the model set out in 3.(a) to 3.(e) above) are set to equal observed or expected values provided by the user for those statistical attributes and/or additional multi-variate equations are specified, to be solved for the unknown parameters (S34 and S36).
7. Parameters of interest to the user are then output from the computer (S24 or S38), these may include (but are not limited to) one or more of:
   a) the price or value of one or more of the options and/or of the underlying asset;
   b) the expected rate of return on one or more of the options and/or of the underlying asset;
   c) the expected volatility (and/or higher moments of interest to the user) of one or more of the options and/or of the underlying asset;
   d) the risk premium for one or more of the priced risk factors;
   e) the probability of exercise; and
   f) any other user specified metrics, derivatives and/or hedge ratios.

A Preferred Embodiment of the Model of the Invention With Application to Pricing a European Call Option on a Non-dividend Paying Stock A simple example application of a preferred embodiment of the invention is presented for pricing a European call option on a non-dividend paying stock. The terminal stock price distribution is assumed, in this example, to follow the lognormal distribution (i.e. stock returns are assumed to be normally distributed). The assumptions conventionally made by those with ordinary skill in the art when applying a simple version of an option pricing model are made (e.g. there are no taxes, no transaction costs etc.) in this example embodiment.

Defining:

$C_n$ is the value of the call option at time n $S_n$ is the value of the stock (the underlying asset upon which the option is written) at time n X is the exercise price of the option T is the time to maturity (the expiry date) of the option, in years $r_S$ is the rate of return on the stock, per annum $r_C$ is the rate of return on the call option, per annum $$d_1 = ([\ln(S_0/X) + r_S T]/\sigma_S \sqrt{T}) + (1/2)(\sigma_S \sqrt{T})$$

$$d_2 = d_1 - \sigma_S \sqrt{T}$$

N(•) is the cumulative probability of the standard normal distribution with $d_1$ or $d_2$ as the upper limit r is the risk free rate of return, per annum $\sigma_S$ is the standard deviation of rates of return on the stock, per annum $\sigma_C$ is the standard deviation of rates of return on the call option, per annum.

At time T the expected values of the stock ($S_T$) and the call option ($C_T$) are given as:

$$S_T = S_0 e^{r_S T} \quad (13)$$

$$C_T = S_T N(d_1) - XN(d_2) = C_0 e^{r_C T} \quad (14)$$

The present value of the call option ($C_0$) is the time T value of the call option discounted back to present value using a risk adjusted discount rate ($r_C$). Hence:

$$C_0 = S_0 e^{(r_S - r_C)T} N(d_1) - X e^{-r_C T} N(d_2) \quad (15)$$

This is the option pricing model of Samuelson (1965), but Samuelson did not derive a relationship between $r_S$ and $r_C$.

The excess rate of return for a security is defined as the expected rate of return in excess of the risk free rate of return. Under the model of the invention the excess rate of return for each security issued, referenced to, or being a claim on the same underlying asset is proportional to the riskiness of that security. There may be more than one risk factor that is priced in the case of one, some or all of the securities. However, the price per unit of risk ($\lambda_m$), for each priced risk factor (m), is the same for all securities that are referenced to the same underlying asset. Furthermore, in the case of volatility risk, this is measured over a discrete time period.

In this example only one risk factor is priced, being the volatility (i.e. the standard deviation, $\sigma$) of the expected returns for each security, measured over a discrete time period. Hence the following condition, in this example, is specified in the model of the invention:

$$\lambda_\sigma = \frac{r_S - r}{\sigma_S} = \frac{r_C - r}{\sigma_C} \quad (16)$$

In this example $\sigma_S$ and $\sigma_C$ are specified consistent with the model of the invention, over the discrete time period T. Equation (16) can be rearranged as:

$$r_C = r + (r_S - r) \frac{\sigma_C}{\sigma_S} \quad (17)$$

Huang, Srivastava and Raatz (in Huang, T., Srivastava, V. and Raatz, S. Portfolio Optimisation with Options in the Foreign Exchange Market, Derivatives Use, Trading & Regulation, 2001, 7(1), 55-72) provide a real world, discrete time formula for measuring the volatility (and higher moments) of an option ($\sigma_C$). Based on their formula the annualised volatility (i.e. standard deviation of expected returns) of a vanilla call option is given as:

$$\sigma_C = \sqrt{\ln\left(\frac{S_T^2 N(d_3) e^{\sigma_S^2 T} - 2 S_T X N(d_1) + X^2 N(d_2)}{C_T^2}\right) / T} \quad (18)$$

where the additional term is:

$$d_3 = d_1 + \sigma_S \sqrt{T}$$

Based on estimates or values for $r_S$ and $\sigma_S$ equations (13), (14) and (18) can be solved. Following which equation (17) can be solved to determine $r_C$, then finally equation (15) is solved to provide the present value of the call option ($C_0$).

As can be appreciated by one with ordinary skill in the art the equations of the type presented above can be inverted, for example, to solve for $r_S$ and/or $\sigma_S$ given observed traded option prices for one or more options written on the same underlying asset. The user can, of course, allow for the estimates of $r_S$ and/or $\sigma_s$ to be time varying and/or allow for more complex processes in modelling the price behaviour of the underlying asset, including use of empirical distributions.

Figure 8:
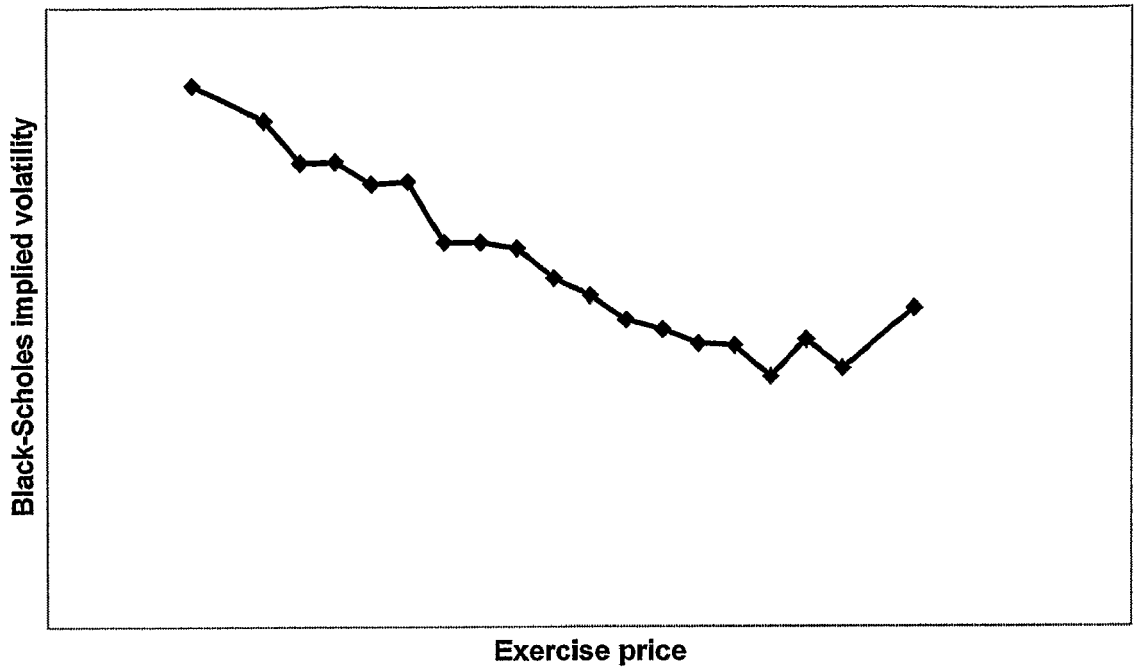
FIG. 8 is a graph that depicts the Black-Scholes implied volatilities for call options on the Dow Jones Industrial Index.

FIG. 8 is a graph that depicts the Black-Scholes option pricing model implied volatilities for exchange traded call options written on the Dow Jones Industrial Average stock market index on 22 Jan. 2003. The options all had a life of one month, but different exercise (or strike) prices. Despite the Black-Scholes option pricing model being based on the premise of a single volatility input being applicable in such circumstances, the volatilities implied by market option prices and inverting the Black-Scholes model clearly differ across the different strike prices. The so called "volatility smile" problem is evident.

Figure 9:
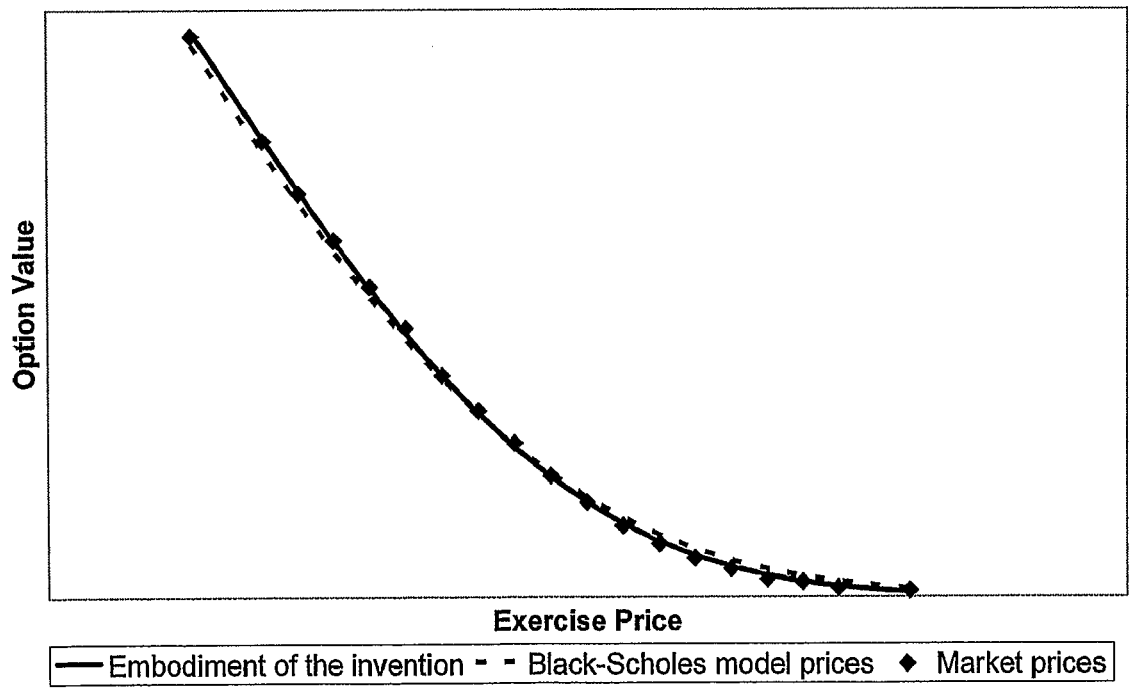
FIG. 9 is a graph that depicts market values for call options on the Dow Jones Industrial Index, Black-Scholes option pricing model prices for the said options and option prices derived from a preferred embodiment of the invention for the said options.

FIG. 9 is a graph that depicts the market prices for the options analysed in FIG. 8 (depicted on the graph by symbols) plotted against exercise price. The Black-Scholes option pricing model was then fitted against these prices, by finding the single index volatility input that minimised the pricing errors (depicted on the graph by a broken line). A preferred embodiment of the invention was then fitted against the same market prices, by finding the single index volatility and index risk premium inputs that minimised the pricing errors (depicted on the graph by a solid line). It can be seen from FIG. 9 that in this example the Black-Scholes option pricing model under prices in-the-money options and over prices out-of-the-money options. Whereas a preferred embodiment of the invention provides a much closer fit to observed market prices across all exercise prices.

A Preferred Embodiment of the Model of the Invention With Application to Pricing a European Call Option on a Non-dividend Paying Stock and Pricing Skewness Risk The simple example application of a preferred embodiment of the invention given above (where only volatility risk is priced) is extended to include pricing of skewness risk. Where skewness (Sk)) is priced the expected rates of return on the stock and the call option become:

$$r_S = r + \lambda_\sigma \sigma_S + \lambda_{Sk} Sk_S \quad (19)$$

$$r_C = r + \lambda_\sigma \sigma_C + \lambda_{Sk} Sk_C \quad (20)$$

The use can specify the basis upon which Sk and any other moments are measured (for example, if a non-linear pricing relationship is to be modelled, if the moments are to be standardised with respect to standard deviation, be expressed in excess terms vis-à-vis a standard statistical distribution etc.). Based on Huang, Srivastava and Raatz's (2001) formula the real world, discrete time skewness of a call option's pay offs ($Sk_{C_T}$) is:

$$\begin{aligned} Sk_{C_T} &= E[C_T^3] - E[C_T]^3 \\ &= S_T^3 N(d_4) e^{3\sigma_S^2 T} - 3 S_T^2 X N(d_3) e^{\sigma_S^2 T} + 3 S_T X^2 N(d_1) - \\ & \quad X^3 N(d_2) - [S_T N(d_1) - X N(d_2)]^3 \end{aligned} \quad (21)$$

where the additional term is:

$$d_4 = d_3 + \sigma_S \sqrt{T}$$

This skewness parameter can then be standardised, expressed in excess terms and/or annualised etc. (as specified by the user) for use in equation (20). Based on estimates or values for $r_S$ and $\sigma_S$ equations (13), (14), (18) and (21) can be solved. To continue fitting the model values are then required for $\lambda_\sigma$ and $\lambda_{Sk}$. These may, for example, be provided by the user, or be solved for by fitting the model to observed traded option prices (providing sufficient observations are available to satisfactorily solve for the number of unknown parameters). Following solution of equation (20) equation (15) is solved to provide the value of the call option ($C_0$). As can be appreciated by one with ordinary skill in the art the above form of system of equations can be inverted or solved in different ways, in order to estimate the value of one or more unknown parameters (such as, without limitation, $r_S$, $\sigma_S$, $\lambda_\sigma$ and/or $\lambda_{Sk}$).

Those with ordinary skill in the art will appreciate that the concepts presented in preferred embodiments of the invention, as applied to option analysis, can be applied to put options as well as call options, more complex options, different types of distribution etc. For relatively simple types of option and/or the assumption of a particular statistical distribution for the underlying asset, the model of the invention, as applied to option analysis, can be readily implemented on a computer using closed-form-type model formulae. More complex options and/or distribution types (including empirical distributions) may require use of other mathematical tools and/or modelling approaches, of which a wide range are known to those with ordinary skill in the art. For example, without limitation, other tools that might be used to implement any embodiment of the invention using a computer include the binomial model, the trinomial model, the finite difference method, analytical approximations, the certainty equivalent approach and Monte Carlo simulation.

Those with ordinary skill in the art will also appreciate that the various extensions and modifications made under the risk neutral option pricing approach (for example, but not limited to, features such as dividend paying stocks, asset price jumps, stochastic volatility, compound options etc.) can readily be incorporated into embodiments of the invention.

A Preferred Embodiment of the Model of the Invention With Application to an Option-Theoretic Model of the Firm The steps of a preferred embodiment of the invention for analysing debt and equity securities in a computer implemented option-theoretic model of the firm are as follows:

1. Specify a return process for the value of the firm's assets, using real world (as opposed to "risk neutral world") parameters. The return process can include a defined statistical distribution (e.g. the normal return distribution often used in financial models), be based on an empirical distribution or such other process specified by the user. In statistical terms the distribution of asset returns from the specified process may include user defined attributes such as jumps, skewness and kurtosis. Furthermore, the return process may be a function of several factors or processes, including, for example, stochastic volatility, stochastic interest rates and/or incorporate allowance for taxes and income distributions.

2. Specify the pay-off structure for the securities issued by the firm and for any other potential claims on or referenced to the firm's assets, as specified by the user. Without loss of generality the securities or potential claims can include common equity (being the residual claim over the firm's assets), one or more classes of debt security, taxes, bankruptcy costs, firm value lost upon default etc. The pay-off structure is related to a default barrier, which may be a value, be modelled as a process specified by the user or be endogenous to the model. The pay-off, or recovery upon default, of default risky securities issued by the firm may be specified by the user or be endogenous to the model.

3. Given 1. and 2. above the following can be defined (for example, depending upon the complexity of the model, by closed-form formula):
   (a) The expected mean pay-off of each security issued against or referenced to, or claim on, the firm's assets;
   (b) The expected volatility of each security issued against or referenced to, or claim on, the firm's assets;
   (c) Any higher statistical moments or statistical attributes of interest to the user of each security issued against or referenced to, or claim on the firm's assets (for example; skewness, co-skewness, kurtosis, co-kurtosis, jump risk etc.);
   (d) The correlation and/or covariance of expected returns between pairs of securities issued against and/or referenced to, and/or claims on the firm's assets;
   (e) The correlation and/or covariance of expected returns between each security issued against or referenced to, or claims on the firm's assets and the expected returns on the firm's assets.

4. The value of each security (or claim over the firm's assets) at the beginning of the period of interest is related to the expected value of that claim/security at the end of the period of interest by a discount rate (or expected rate of return) specific to that claim/security.

5. The discount rate for each of the firm's securities comprises the sum of a risk free rate of return and a risk premium for each risk factor that is being priced in the model (for example, in a basic implementation the only priced risk factor would be the volatility, i.e. standard deviation, of expected returns measured over a discrete time period). For each security each risk premium (for each priced risk factor) is the product of the security's exposure or sensitivity to that risk factor and a price for that risk factor. In the case of the volatility of expected returns (and any higher statistical moments thereof), the price of each such risk factor is the same for all firm specific securities.

In its simplest form only one risk factor is priced, the volatility of each security's expected returns, measured over discrete time. In more complex specifications of the model one or more additional risk factors are priced, including (but not limited to); skewness, kurtosis, other higher statistical moments, jumps, interest rate risk factors, liquidity and size.

The price for each risk factor related to the moments of expected return (e.g. volatility) is the same for each security issued by the firm, but not necessarily the same as for the price for each such risk factor when measured across the firm's total underlying assets. The model of the invention differs from other known models as the latter specify that the security specific price for volatility risk, used to value each security issued by the firm, is the same as the price for the volatility risk when measured across the firm's total assets.

The inventor has established, with the model of the invention, that the price per unit of volatility risk in an option-theoretic model of the firm is generally greater for individual securities than it is for the firm's assets in total. Hence equating this price of risk across all of the firm's securities, as opposed to equating it to the price of risk for the firm's assets in total, enables the model to be fitted properly to real world data.

The invention also differs from other models known in the art, such as the Capital Asset Pricing Model and the Arbitrage Pricing Theory, which latter models include a market-wide price of risk. The latter models are not based on firm specific measures of total risk, but rather are implemented by only pricing the systematic or market correlated element of firm risk.

6. Given the framework described above, the model can be solved (S22 or S32) for one or more unknown parameters using standard mathematical tools. The fundamental valuation principle in 4. and 5. above provides conditions the model should satisfy for each security the firm has on issue (including equity). If too many model input parameters are unknown, to be able to satisfactorily solve the model, then one manner in which the plurality of unknown input parameters can be solved is by specifying additional conditions, such that one or more of the model outputs (for example, the statistical attributes of the model set out in 3.(a) to 3.(e) above) are set to equal observed or expected values provided by the user for those statistical attributes and/or additional multi-variate equations are specified, to be solved for the unknown parameters (S34 and S36).

7. Parameters of interest to the user are then output from the computer (S24 or S38), these may include (but are not limited to) one or more of:
   a) the price or value of one or more of the securities and/or the firm's total assets;
   b) the expected rate of return on one or more of the securities and/or the firm's total assets;
   c) the expected volatility (and/or other higher moments of interest to the user) of one or more of the securities and/or the firm's total assets;
   d) the risk premium for one or more of the priced risk factors;
   e) the probability of default;
   f) the promised yield on one or more of the debt-type securities;
   g) the expected default loss on one or more of the debt-type securities;
   h) the expected loss given default on one or more of the debt-type securities;
   i) any other user specified metrics, derivatives and/or hedge ratios.

A Preferred Embodiment of the Model of the Invention With Application to an Option-Theoretic Model of the Firm with a Single Class of Debt on Issue In a simple example application of a preferred embodiment of the invention to an option-theoretic model of the firm, the firm is assumed to have only a single class of debt on issue, being zero coupon debt all maturing on the same date and ranking equally on liquidation of the firm. The firm is assumed to pay no dividends and the other assumptions conventionally made by those with ordinary skill in the art when applying a simple version of an option-theoretic model are made (e.g. there are no taxes, no transaction costs etc.) in this example embodiment.

Defining:

$S_n$ is the value of the (common) equity of the firm at time n
$V_n$ is the value of the firm (the underlying assets) at time n. In this example the value of the firm is the sum of the values of the firm's debt (B) and equity (S)
X is the face value of the firm's debt (B), which is assumed to be a single zero-coupon bond, at maturity (i.e. the "exercise price")
T is the time to maturity (the expiry date) of the firm's debt, or the user selected time horizon, in years
$r_V$ is the rate of return on the firm's assets, per annum
$r_S$ is the rate of return on the firm's equity, per annum
$r_B$ is the rate of return on the firm's debt, per annum
y is the promised yield on the firm's debt, per annum $$d_1 = ([\ln(V_0/X) + r_V T]/\sigma_V\sqrt{T}) + (1/2)(\sigma_V\sqrt{T})$$

$$d_2 = d_1 - \sigma_V\sqrt{T}$$

$N(\cdot)$ is the cumulative probability of the standard normal distribution with $d_1$ or $d_2$ as the upper limit
r is the risk free rate of return, per annum
$\sigma_V$ is the standard deviation of rates of return on the firm's assets, per annum
$\sigma_B$ is the standard deviation of rates of return on the firm's debt, per annum
$\sigma_S$ is the standard deviation of rates of return on the firm's equity, per annum
$\rho_{jk}$ is the correlation coefficient of the two variables j and k.

Then the value of the equity of the firm (S) can be viewed as the value of a call option on the firm's assets (V), exercisable at time T by paying off the face value of debt outstanding at that time (X).

At time T the expected values of the firm's assets ($V_T$), the firm's debt ($B_T$) and the firm's equity ($S_T$) are given as:

$$V_T = V_0 e^{r_V T} \tag{22}$$

$$B_T = V_T[1 - N(d_1)] + XN(d_2) = B_0 e^{r_B T} \tag{23}$$

$$S_T = V_T N(d_1) - XN(d_2) = S_0 e^{r_S T} \tag{24}$$

And at time T the promised amount of the firm's debt (X) is given as:

$$X = B_0 e^{yT} \tag{25}$$

Substituting equations (21) and (24) into equations (22) and (23) and rearranging results in:

$$r_B = \ln\left(\frac{V_0 e^{r_V T}[1 - N(d_1)] + B_0 e^{yT} N(d_2)}{B_0}\right) / T \tag{26}$$

$$r_S = \ln\left(\frac{V_0 e^{r_V T} N(d_1) - B_0 e^{yT} N(d_2)}{S_0}\right) / T \tag{27}$$

The excess rate of return for a security is defined as the expected rate of return in excess of the risk free rate of return. Under the model of the invention the excess rate of return for each security issued by the firm is proportional to the riskiness of that security. There may be more than one risk factor that is priced in the case of one, some or all of the securities issued by the firm (for example, a liquidity premium—that might be a function of the total value of type of security on issue or actively traded). However, the price per unit of risk ($\lambda_m$), for each priced risk factor (in), is the same for all securities issued by, or referenced to, the firm.

In this example only one risk factor is priced, being the volatility (i.e. the standard deviation, $\sigma$) of the expected returns for each security measured over a discrete time period. Hence the following condition, in this example, is specified in the model of the invention:

$$\lambda_\sigma = \frac{r_B - r}{\sigma_B} = \frac{r_S - r}{\sigma_S} \tag{28}$$

In this example $\sigma_B$ and $\sigma_S$ are specified consistent with the model, over the discrete time period T.

Combining equations (26) and (27) into (28) provides the following equation for pricing (or estimating the expected returns of), in this example, the firm's debt and equity:

$$\frac{\ln\left(\frac{V_0 e^{r_V T}[1-N(d_1)] + B_0 e^{yT} N(d_2)}{B_0}\right)\Big/ T - r}{\sigma_B} = \frac{\ln\left(\frac{V_0 e^{r_V T} N(d_1) - B_0 e^{yT} N(d_2)}{S_0}\right)\Big/ T - r}{\sigma_S} \quad (29)$$

The difference between the promised yield on a firm's debt and the risk free rate of return available for an equivalent maturity is the "credit spread" (=y−r). Under the model of the invention only a proportion of the credit spread is attributed to the expected default loss, the latter being the product of the probability of the firm being in default at time T and the loss given default. That proportion is equal to y−$r_B$. The remainder of the credit spread, in this simple example, is a risk premium to reward an investor in the firm's debt for the volatility of the expected returns from that debt, in this case that risk premium is equal to $r_B$−r.

Under the model of the invention the following condition is not specified and need not hold true after equation (28) is satisfied:

$$\lambda_\sigma = \frac{r_V - r}{\sigma_V} \quad (30)$$

Equation (29) specifies that the price of volatility risk for the firm is given by the excess return on the firm per unit of firm risk, as has been proposed in the prior art.

Example Methods for Fitting a Preferred Embodiment of the Model of the Invention with Application to an Option-Theoretic Model of the Firm, With More Than One Unknown Input Variable In the example given above of a preferred embodiment of the invention with application to an option-theoretic model of the firm, where V=S+B, equation (29) can be solved (where a mathematically feasible solution exists) where one of the input variables is unknown. This can be done using standard mathematical tools.

Where more than one input variable is unknown more than one feasible solution may exist, unless additional conditions are imposed on the model. Typically in solving such problems an additional condition is imposed for each additional unknown input variable. Additional conditions that can be imposed include matching observed or otherwise estimated (outside of the model) values for various parameters, as provided by the user, with model implied values (specified either instantaneously or over discrete time) for those same parameters (S34 and S36). In this simple example, model implied values for the parameters $\sigma_B$, $\sigma_S$, and/or $\rho_{BS}$ can be estimated and the model fitted or solved to equate these with "known" estimates for the same parameters. Furthermore, additional multi-variate equations can be defined relating the parameters of interest and then be simultaneously or iteratively solved with the model.

In addition, for example, if the model (in the form illustrated in this example) is being solved or implemented in such a way that a "known" time series of firm values is available then model implied values (specified either instantaneously or over discrete time) for the parameters $\sigma_V$, $\rho_{VS}$ and/or $\rho_{VB}$ can be estimated and the model solved to equate these with the "known" estimates for the same parameters.

Example Calculation of Volatilities and Correlations

Under the model of the invention, in the above example, the instantaneous volatility (standard deviation) of the firm's debt and equity returns are given by the following formulae:

$$\sigma_B = \sigma_V \frac{V_0}{B_0} e^{(r_V - r_B)T}[1 - N(d_1)] \quad (31)$$

$$\sigma_S = \sigma_V \frac{V_0}{S_0} e^{(r_V - r_S)T} N(d_1) \quad (32)$$

It is noted that equations with some similarity to, but not the same as, equations (31) and (32) are known in the art in the context of the risk neutral specification of the option-theoretic model of the firm. The equation similar to (32) that is known in the art, and that is sometimes used as an additional condition to solve the risk neutral specification of the option-theoretic model of the firm where two input variables are unknown, is:

$$\sigma_S = \sigma_V \frac{V_0}{S_0} N(d_1) \quad (33)$$

Under the model of the invention, in the above example, the discrete time period volatility of the firm's debt and equity returns (measured over period T) and the pair-wise correlations and covariances between the two securities and the firm value are given by the following formulae:

$$\sigma_B = \sqrt{\ln\left(\frac{V_T^2[1 - N(d_3)]e^{\sigma_V^2 T} + X^2 N(d_2)}{B_T^2}\right)\Big/ T} \quad (34)$$

$$\sigma_S = \sqrt{\ln\left(\frac{V_T^2 N(d_3)e^{\sigma_V^2 T} - 2V_T X N(d_1) + X^2 N(d_2)}{S_T^2}\right)\Big/ T} \quad (35)$$

$$\rho_{BS} = \frac{X - B_T}{B_T \sqrt{(e^{\sigma_S^2 T} - 1)(e^{\sigma_B^2 T} - 1)}} \quad (36)$$

$$\rho_{VB} = \frac{V_T[1 - N(d_3)]e^{\sigma_V^2 T} + X N(d_1) - B_T}{B_T \sqrt{(e^{\sigma_V^2 T} - 1)(e^{\sigma_B^2 T} - 1)}} \quad (37)$$

$$\rho_{VS} = \frac{V_T N(d_3)e^{\sigma_V^2 T} - X N(d_1) - S_T}{S_T \sqrt{(e^{\sigma_V^2 T} - 1)(e^{\sigma_S^2 T} - 1)}} \quad (38)$$

$$\sigma_{BS} = \rho_{BS} \sigma_B \sigma_S \quad (39)$$

$$\sigma_{VB} = \rho_{VB} \sigma_V \sigma_B \quad (40)$$

$$\sigma_{VS} = \rho_{VS} \sigma_V \sigma_S \quad (41)$$

Where the additional term, not previously defined, is:

$$d_3 = d_1 + \sigma_V \sqrt{T} \quad (42)$$

This embodiment of the invention provides a framework for calculating the:
1. expected return on debt and equity securities and on the firm's total assets;
2. expected volatility on the expected return on debt and equity securities and on the firm's total assets;

3. expected correlation and/or covariance between pairs of securities issued by the same firm;
4. expected correlation and/or covariance between each security issued by the firm and the firm's total value;
5. value of debt and equity securities;
6. real world probability of a firm defaulting;
7. expected recovery on securities in default (or expected loss given default);
8. expected default loss;
9. optimal capital structure of a firm; and
10. yield at which a firm can be expected to issue debt securities.

In the computer implemented model of the invention the price for priced risk factors relating to the volatility (and any higher moments that are priced) of expected returns is the same for two or more securities issued by the firm, but not necessarily the same as for the price for such risk factor(s) when measured across the firm's underlying assets. Nor need the price for such risk factor(s) be the same as for securities issued by, or referenced to, other firms.

Preferred Embodiments of the Model of the Invention with Application to Fitting Option-Theoretic Models of the Firm One computer implemented embodiment of the model of the invention provides novel and original methods for fitting or solving the family of option-theoretic models of the firm by generating additional parameters from the model, estimated over a discrete time period, and then solving the model so that these parameters equal values specified by the user, where said parameters include one or more of:
 (a) the volatility of the returns of the common equity issued by the firm, or of securities referenced thereto;
 (b) the volatility of the returns of one or more debt securities issued by, or referenced to, the firm;
 (c) the skewness of the returns of one or more securities issued by, or referenced to, the firm;
 (d) the kurtosis of the returns of one or more securities issued by, or referenced to, the firm;
 (e) the higher statistical moments of the returns of one or more securities issued by, or referenced to, the firm;
 (f) the expected correlation or covariance between the returns of a pair of securities issued by, or referenced to, the firm; and/or
 (g) the expected correlation or covariance between the returns of a security issued by, or referenced to, the firm and the returns of the total firm.

The preferred embodiments of the invention, as applied to an option-theoretic model of the firm, allow for the debt and equity securities issued by a firm to be efficiently analysed in a single computer implemented model.

Figure 1:
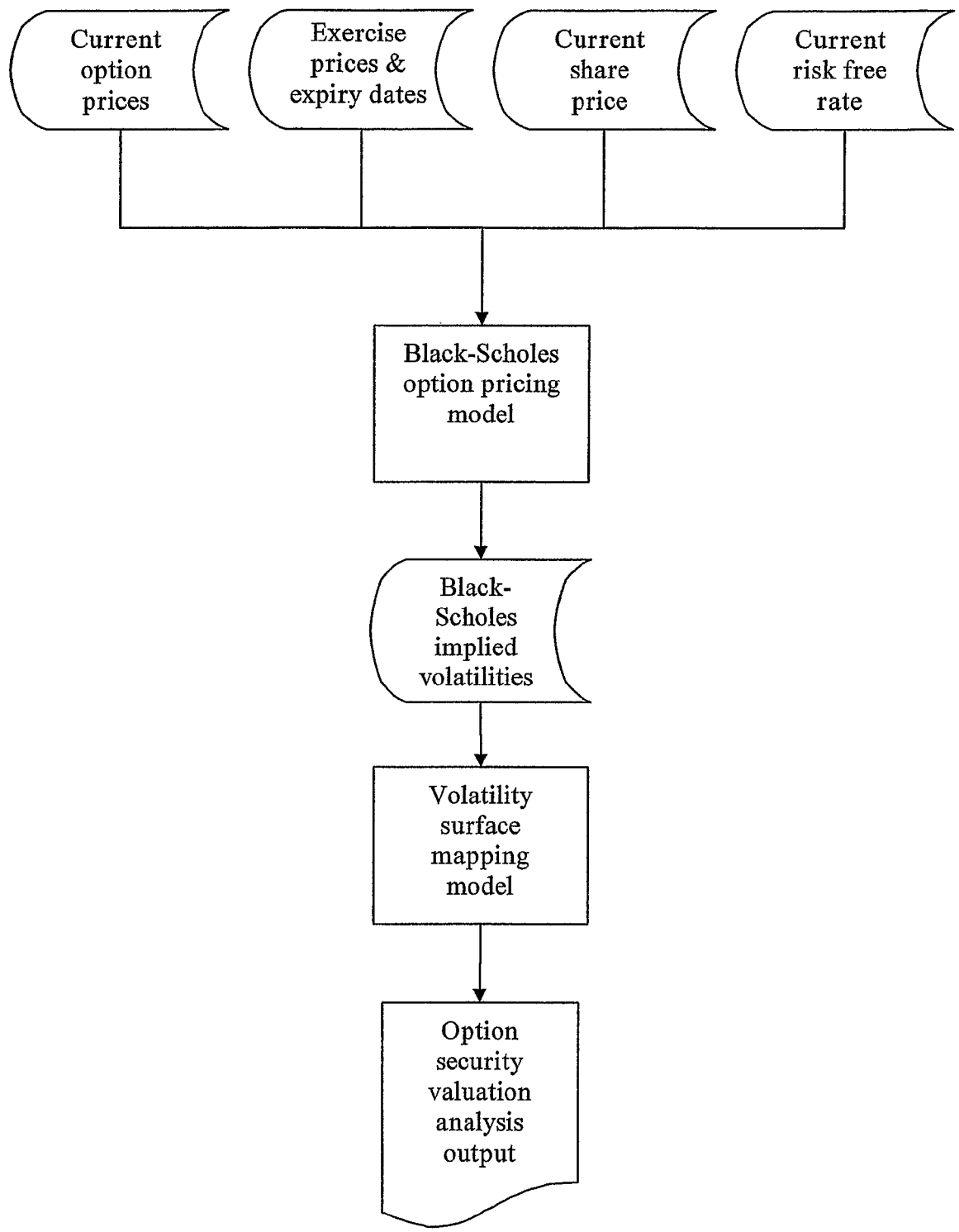
FIG. 1 is a flow chart depicting the main data inputs and computer processing models of an illustrative option valuation analysis known in the art.
Figure 2:
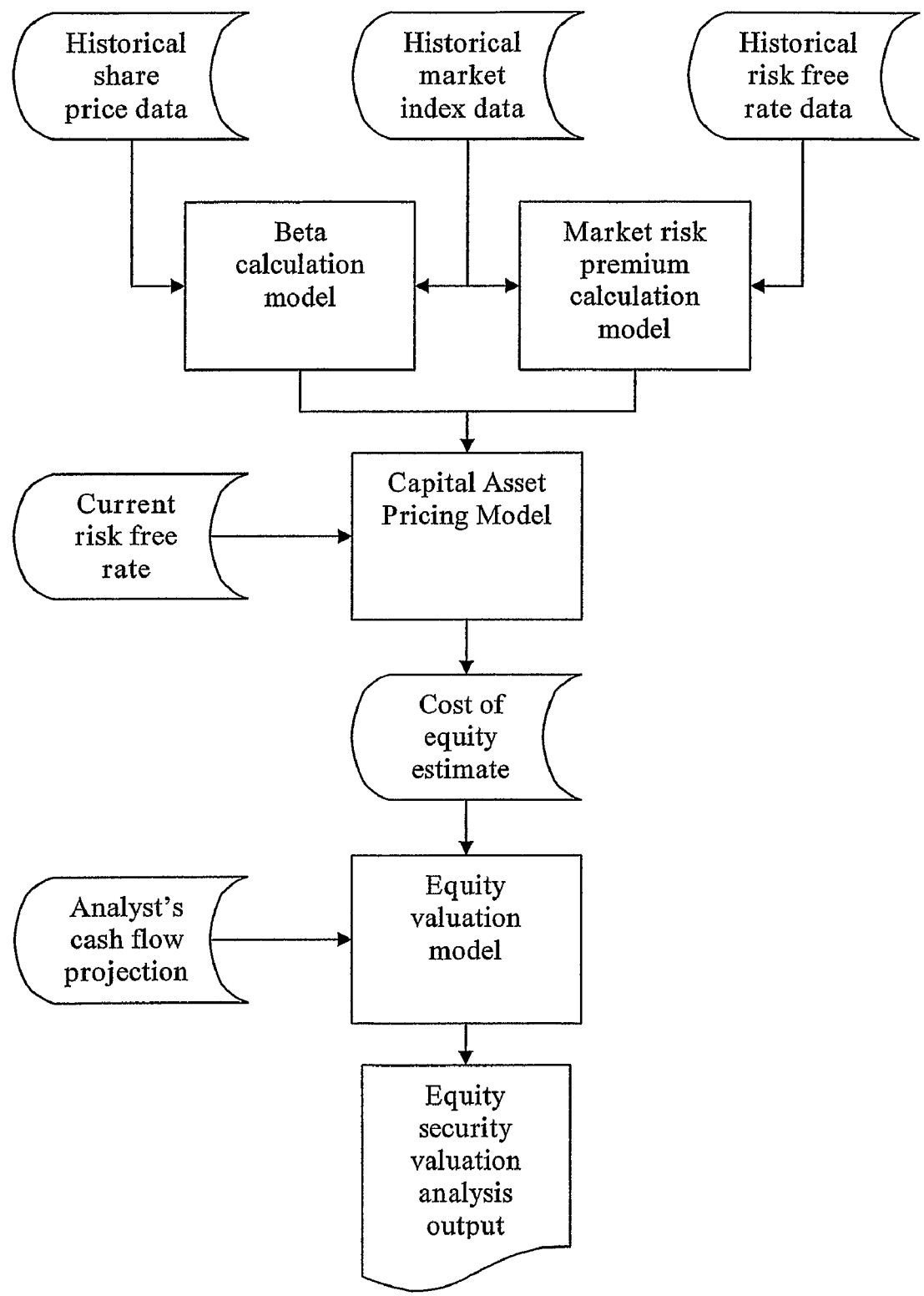
FIG. 2 is a flow chart depicting the main data inputs and computer processing models of an illustrative equity valuation analysis known in the art.
Figure 3:
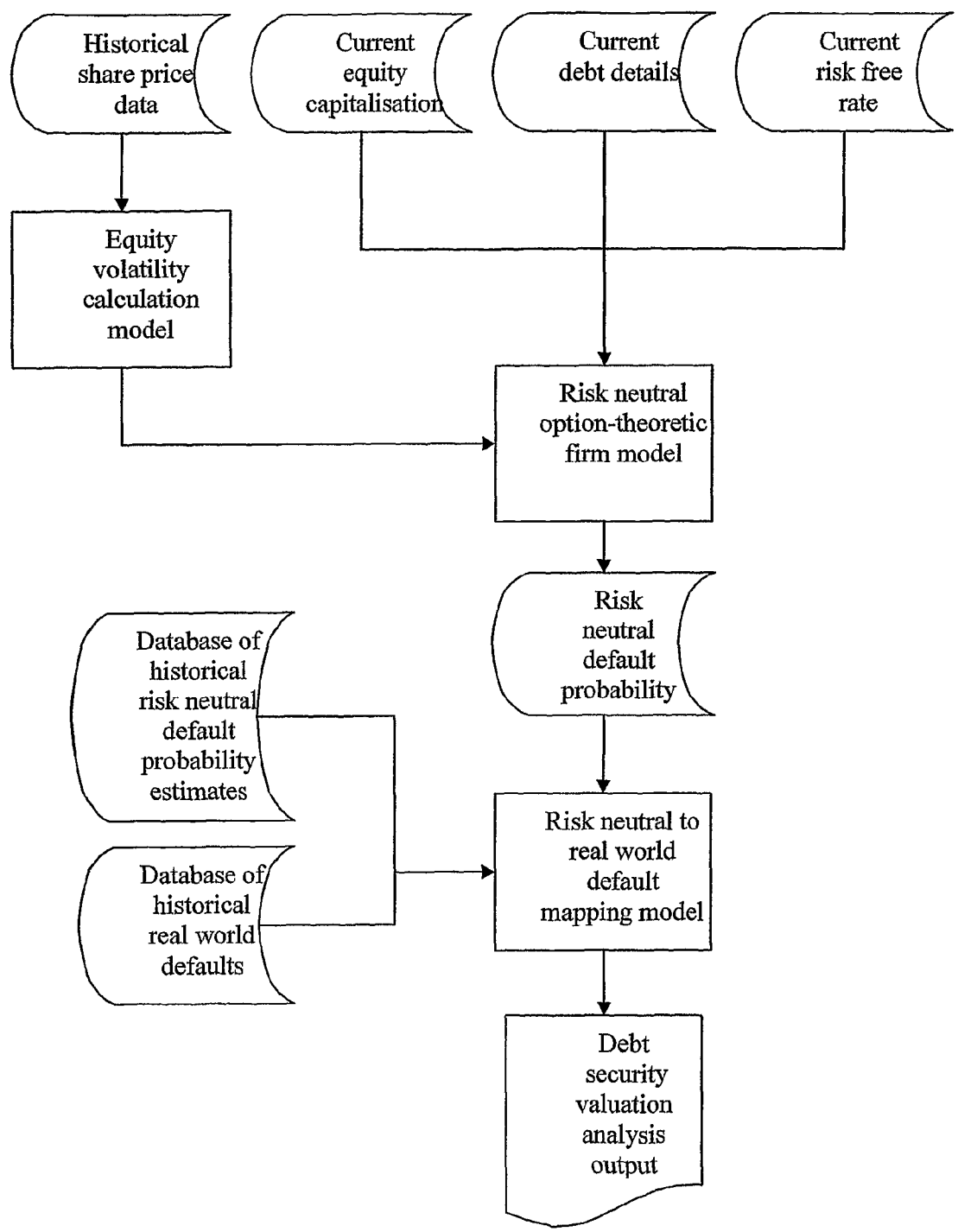
FIG. 3 is a flow chart depicting the main data inputs and computer processing models of an illustrative debt valuation analysis known in the art.
Figure 4:
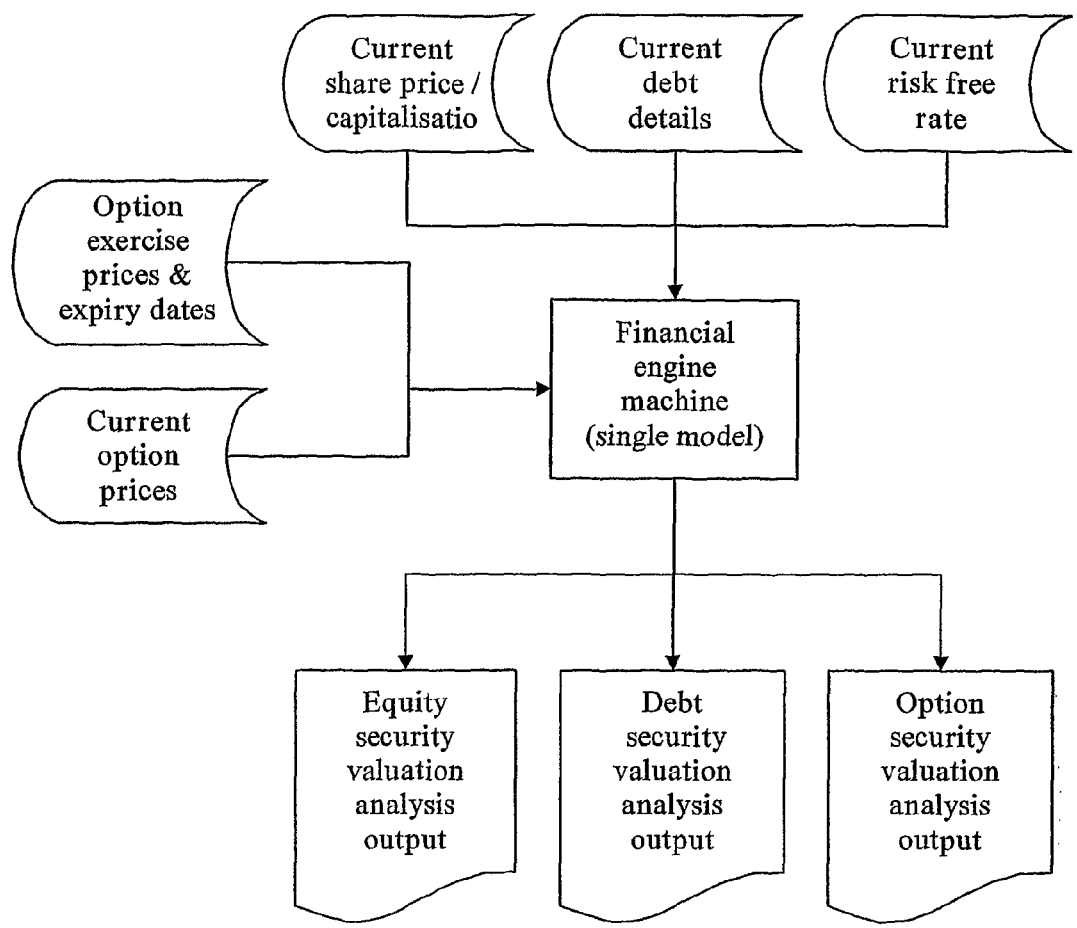
FIG. 4 is a flow chart depicting the main data inputs and computer processing model of an embodiment of the invention. It can readily be appreciated that the invention is able to significantly reduce the range and amount of data inputs required and the number of computer models required (by comparison to those typically in current use, as collectively illustrated in FIGS. 1, 2 and 3)

Combination, Extension and Modification of Preferred Embodiments of the Model of the Invention The various preferred embodiments of the invention disclosed herein can be implemented in combination, so as to parsimoniously fit or solve coherent models to a range of securities that share a common source of underlying firm or asset risk, with consequential savings in the computer resources otherwise required. For example, preferred embodiments of the invention applied to the analysis of debt and equity securities can be integrated with preferred embodiments of the invention applied to the analysis of options written over said debt and equity securities. In one preferred embodiment the firm specific price of risk for each priced risk factor is equated across different models. In another preferred embodiment the distribution process for the firm's underlying assets is analysed in a single computer implemented model and then all of the options, debt and equity securities that are issued by, or referenced to, the firm (or its underlying assets) are analysed in that single model (FIG. 4) such that all of these securities share the same price of risk for each priced risk factor. As will be appreciated by those with ordinary skill in the art this latter embodiment, in particular, has the potential to significantly reduce the computing resources that would otherwise be required to analyse the different types of security.

In implementing preferred embodiments of the invention the priced risk factors need not only relate to the statistical moments of the expected returns of the assets or securities being analysed. Other risk factors and user specified adjustments may include liquidity premiums, size premiums, tax adjustments and so forth.

Those with ordinary skill in the art will also appreciate that the various extensions and modifications made to risk neutral implementations of the option-theoretic model of the firm can readily be incorporated into risk premium inclusive option-theoretic embodiments of the invention. Examples of such extensions, without limitation, include:
1. The possibility of early default (Black, F. and Cox, J. C. Valuing Corporate Securities: Some Effects of Bond Indenture Provisions, Journal of Finance, 1976, 31 (2), 351-367);
2. Incomplete information—uncertain firm asset value (Duffie, D. and Lando, D. Term Structures of Credit Spreads With Incomplete Accounting Information, Econometrica, 2001, 69 (3), 633-664);
3. Incomplete information—uncertain default barrier and/or firm asset value (Giesecke, K. Correlated Defaults, Incomplete Information and the Term Structure of Credit Spreads, Dissertation, Humboldt University Berlin, 2001); and
4. The possibility of early default and a jump-diffusion asset price process (Zhou, C. The Term Structure of Credit Spreads With Jump Risk, Journal of Banking & Finance, 2001, 25 (11), 2015-2040).
5. Solving for unobservable total firm asset value (Moodys KMV approach).
6. Default barrier being at set a value other than the face value of debt (Moodys KMV approach).

It will also be appreciated that although various formulae described herein express some parameters on an annualised basis, embodiments of the invention can be implemented using alternative bases for measuring time (such as days, weeks or months).

Accordingly, although the invention has been described in detail with reference to particular preferred embodiments, persons possessing ordinary skill in the art to which this invention pertains will appreciate that various modifications, changes and enhancements may be made without departing from the spirit and scope of the claims that follow.

The invention claimed is:

1. A computer implemented method for relating a price or value of each of a plurality of securities associated with an underlying asset, a rate of return on each of the plurality of securities, and risk attributes of each of the plurality of securities, the method comprising the steps of:
 receiving, by one or more computers, data on a plurality of securities;
 determining, by the one or more computers, a risk premium incorporated in the rate of return for each of the plurality of securities, wherein the risk premium for each of the plurality of securities comprises a difference between the rate of return for that security and a risk free rate of return;
 determining, by the one or more computers, one or more priced risk factor premiums, wherein each of the priced risk factor premiums is a price per unit of risk for a priced risk factor multiplied by a measure of the security's exposure to that priced risk factor, and wherein the risk premium for each of the securities is the priced risk factor premium, or, when the priced risk factor premium is part of a plurality of priced risk factor premiums, a sum of priced risk factor premiums;

wherein one of the priced risk factor premiums is in respect of volatility measured over a discrete time and wherein a price per unit of volatility is the same for two or more of each of the plurality of securities;

creating, by the one or more computers, a model for execution by the one or more computers, wherein the model calculates at least one value based on the determined priced risk factor premium; and storing, by the one or more computers, the determined priced risk factor premiums for the plurality of securities, the calculated model and the at least one value.

2. The computer implemented method of claim 1, wherein at least one of said plurality of securities is a debt-type instrument, and further comprising analysing a yield spread associated with the debt-type instrument and identifying a default loss component and a risk premium component of said yield spread.

3. The computer implemented method of claim 1, further comprising fitting the model.

4. The computer implemented method of claim 3, further comprising providing as output to a user parameters of the fitted model.

5. The computer implemented method of claim 1, wherein the rate of return for a security of the plurality of securities is analysed utilising an estimate of an expected default loss of another security of the plurality of securities that is of a debt-type (security j), the method further comprising the steps of:

determining the rate of return on security j ($r_j$) by reference to a promised yield on said security ($y_j$) and the expected default loss ($EDL_j$) on said security where:

$r_j = y_j - EDL_j$ calculating the risk premium for said security j as equal to $r_j - r$, where r is the risk free rate of return;

calculating the exposure of each security to each priced risk factor (m);

calculating the price per unit of risk ($\lambda_m$) for each priced risk factor (m), wherein each $\lambda_m$ is the same for two or more securities issued by, or referenced to, a firm and wherein a sum of a product of the exposures for security j and the prices per unit of risk equals the risk premium for security j, and for any other security for which an estimate of its risk premium is available;

designating that one of the priced risk factors relates to the volatility, estimated over a discrete time period, of the rate of return on securities and is specific to securities issued by, or referenced to, the firm;

calculating an excess rate of return for all other securities, other than j, based at least partly on their exposure to each priced risk factor and the price per unit of risk for each risk factor;

fitting the model; and providing as output to a user parameters to the user from the fitted model.

6. The computer implemented method of claim 5, wherein the only priced risk factor comprises a volatility of returns and is implemented by:

designating a relationship between a firm specific price of volatility risk ($\lambda_\sigma$), the rate of return for j ($r_j$), the volatility of returns ($\sigma_j$) and the risk free rate of return (r) as:

$$\lambda_\sigma = \frac{r_j - r}{\sigma_j}$$

designating the rate of return ($r_k$) on at least one class, of security (k) issued by, or referenced to, the firm as:

$r_k = r + \lambda_\sigma \sigma_k$ designating, where security class or classes k are debt-type securities, the default loss on said securities by combining the promised yield on said securities ($y_k$) and their rate of return ($r_k$) as follows:

$EDL_k = y_k - r_k$ fitting the model; and providing as output to a user parameters of interest from the fitted model.

7. The computer implemented method of claim 1, wherein one or more of the plurality of securities is an option, the method further comprising the steps of:

specifying a real world distribution process that returns on an underlying asset are expected to follow;

receiving pricing data on the option;

receiving adjustments for at least one factor specified by a user;

calculating an expected real world probability of the option being exercised based on the real world distribution process and the option's pricing features;

calculating an expected mean, an expected standard deviation and other higher moments of interest of the option, at a time the option is expected to be exercised;

using the expected mean value of the option, at the time the option is expected to be exercised, and the option's pricing data to calculate an expected real world pay off from the option;

discounting back to present value at a chosen evaluation date the expected real world pay off from the option using a risk adjusted discount rate, where said risk adjusted discount rate includes a priced risk factor premium for the expected standard deviation measured over discrete time of the expected real world pay off, for such other higher moments of interest to the user and adjustments for the at least one factor specified by the user, wherein the price per unit of risk, for each risk factor, is equated for two or more assets or securities selected from the option being discounted, the underlying asset and any other securities of interest referenced thereto; and providing as output to the user parameters from a fitted model.

8. The computer implemented method of claim 7, further comprising the step of using the calculated values for the rate of return, standard deviation, other higher moments of interest and any other factors specified by the user for the asset as input to price or value other options contingent on the same or similar assets.

9. The computer implemented method of claim 7, wherein the real world distribution process that the returns on the underlying asset are expected to follow is modelled as a specified statistical distribution, wherein the expected mean, the expected standard deviation and other higher moments of interest of the portions of that distribution relevant to the one or more plurality of securities are estimated using closed-form type formula solutions or numerical approximations appropriate for the specified distribution process.

10. The computer implemented method of claim 9, wherein the real world distribution process that returns on the underlying asset are expected to follow is a normal distribution.

11. The computer implemented method of claim 1, wherein a user applies an option-theoretic model of a firm, the method further comprising the steps of:
   determining a plurality of input parameters, the parameters including a risk premium in the rate of return for each security issued by, or referenced to, the firm;
   defining relationships between said parameters;
   fitting the model; and
   providing as output to a user parameters from the fitted model.

12. The computer implemented method of claim 11, further comprising the steps of:
   receiving pricing data on the securities;
   receiving adjustments for at least one factor specified by a user;
   specifying a real world distribution process that returns on total assets of the firm are expected to follow;
   specifying a default point representing a value of the total assets of the firm at which the firm is expected to default;
   calculating an expected real world probability of the default point being met;
   calculating an expected mean, an expected standard deviation and other higher moments of interest of the securities, based on a real world distribution process modelled for the total assets of the firm and the default point, at the time horizon of interest;
   using the expected mean value of the securities, at the time horizon of interest, and the securities' pricing data to calculate an expected real world pay off of the securities, at the time horizon of interest;
   discounting back to present value at a chosen evaluation date the expected pay offs of each security using a risk adjusted discount rate, where said risk adjusted discount rate includes a priced risk factor premium for the expected standard deviation of the expected pay off from the security, for such other higher moments of interest to the user and adjustments for the at least one factor specified by the user, wherein the price per unit of risk, for each such risk factor, is equated for two or more securities issued by, or referenced to, the firm;
   fitting the model; and
   providing as output to a user parameters from the fitted model.

13. The computer implemented method of claim 12, wherein the real world distribution process that the returns on the total assets of the firm are expected to follow is modelled as a specified statistical distribution, wherein the expected mean, the expected standard deviation and other higher moments of interest of the portions of that distribution relevant to a security of the plurality of securities are estimated using closed-form type formula solutions or numerical approximations appropriate for the specified statistical distribution process.

14. The computer implemented method of claim 13, wherein the real world distribution process that the returns on total assets of the firm are expected to follow is a normal distribution.

15. The computer implemented method of claim 14, wherein the firm has, or is treated as having, only a single class of zero coupon debt on issue and further comprising the steps of:
   receiving values for:
      a value of an equity of the firm at time n ($S_n$),
      a value of the total assets of the firm at time n ($V_n$), wherein the value of the total assets of the firm is a sum of values of a firm's debt ($B_n$) and equity ($S_n$),
      a face value (X) of the firm's debt (B), which is assumed to be a single zero-coupon bond, at maturity,
      a user selected time horizon, in years (T),
      a rate of return on the total assets of the firm, per annum ($r_V$),
      a promised yield on the firm's debt, per annum (y),
      a risk free rate of return, per annum (r),
      a standard deviation of rates of return on the total assets of the firm, per annum ($\sigma_V$),
      a standard deviation of rates of return on the firm's debt, per annum ($\sigma_B$),
      a standard deviation of rates of return on the firm's equity, per annum ($\sigma_S$); calculating values for $d_1$ and $d_2$, wherein:

$$d_1 = ([\ln(V_0/X) + r_V T]/\sigma_V \sqrt{T}) + (1/2)(\sigma_V \sqrt{T}),$$

$$d_2 = d_1 - \sigma_S \sqrt{T};$$

calculating values for:

$$\frac{\ln\frac{V_0 e^{r_V T}[1 - N(d_1)] + B_0 e^{yT} N(d_2)}{B_0} / T - r}{\sigma_B}, \text{ and}$$

$$\frac{\ln\left(\frac{V_0 e^{r_V T} N(d_1) - B_0 e^{yT} N(d_2)}{S_0}\right) / T - r}{\sigma_S}$$

where N(•) is a cumulative probability of a standard normal distribution with $d_1$ or $d_2$ as an upper limit; and
fitting the model such that:

$$\frac{\ln\left(\frac{V_0 e^{r_V T}[1 - N(d_1)] + B_0 e^{yT} N(d_2)}{B_0}\right) / T - r}{\sigma_B} = \frac{\ln\left(\frac{V_0 e^{r_V T} N(d_1) - B_0 e^{yT} N(d_2)}{S_0}\right) / T - r}{\sigma_S}.$$

16. The computer implemented method of claim 11 further comprising the steps of:
   receiving values for:
      a value of an equity of the firm at time n ($S_n$),
      a value of total assets of the firm at time n ($V_n$), wherein the value of total assets of the firm is a sum of values of a firm's debt ($B_n$) and equity ($S_n$),
      a face value (X) of the firm's debt (B), which is assumed to be a single zero-coupon bond, at maturity,
      a user selected time horizon, in years (T),
      a rate of return on the total assets of the firm, per annum ($r_V$),
      a rate of return on the firm's equity, per annum ($r_S$),
      a rate of return on the firm's debt, per annum ($r_B$),
      a standard deviation of rates of return on the total assets of the firm, per annum ($\sigma_V$),
   calculating a value for $d_1$, wherein:

$$d_1 = ([\ln(V_0/X) + r_V T]/\sigma_V \sqrt{T}) + (1/2)(\sigma_V \sqrt{T})$$

calculating a value for an instantaneous standard deviation of rates of return on the firm's debt, per annum ($\sigma_B$), using the formula:

$$\sigma_B = \sigma_V \frac{V_0}{B_0} e^{(r_V - r_B)T}[1 - N(d_1)]; \text{ and/or}$$

calculating a value for an instantaneous standard deviation of rates of return on the firm's equity, per annum ($\sigma_S$), using the formula:

$$\sigma_S = \sigma_V \frac{V_0}{S_0} e^{(r_V - r_S)T} N(d_1);$$

where N(•) is a cumulative probability of a standard normal distribution with $d_1$ as an upper limit; and using one or both said values of instantaneous standard deviation to fit the option-theoretic model of the firm.

17. The computer implemented method of claim 11 further comprising the steps of:

receiving user selection of one or more of the following parameters, to be calculated over discrete time, for calibration with the model:
  a standard deviation of rates of return on a firm's debt, per annum ($\sigma_B$),
  a standard deviation of rates of return on a firm's equity, per annum ($\sigma_S$),
  a correlation of rates of return on the firm's debt and on the firm's equity ($\rho_{BS}$),
  a correlation of rates of return on total assets of the firm and on the firm's debt ($\rho_{VS}$),
  a correlation of rates of return on the total assets of the firm and on the firm's equity ($\rho_{VS}$),
  a covariance of rates of return on the firm's debt and on the firm's equity, per annum ($\sigma_{BS}$),
  a covariance of rates of return on the total assets of the firm and on the firm's debt, per annum ($\sigma_{VB}$),
  a covariance of rates of return on the total assets of the firm and on the firm's equity, per annum ($\sigma_{VS}$),
calculating values for the one or more parameters so selected using one or more of the following formula:

$$\sigma_B = \sqrt{\ln\left(\frac{V_T^2[1 - N(d_3)]e^{\sigma_V^2 T} + X^2 N(d_2)}{B_T^2}\right)/T}$$

$$\sigma_S = \sqrt{\ln\left(\frac{V_T^2 N(d_3)e^{\sigma_V^2 T} - 2V_T X N(d_1) + X^2 N(d_2)}{S_T^2}\right)/T}$$

$$\rho_{BS} = \frac{X - B_T}{B_T \sqrt{(e^{\sigma_S^2 T} - 1)(e^{\sigma_B^2 T} - 1)}}$$

$$\rho_{VB} = \frac{V_T[1 - N(d_3)]e^{\sigma_V^2 T} + XN(d_1) - B_T}{B_T \sqrt{(e^{\sigma_V^2 T} - 1)(e^{\sigma_B^2 T} - 1)}}$$

$$\rho_{VS} = \frac{V_T N(d_3)e^{\sigma_V^2 T} - XN(d_1) - S_T}{S_T \sqrt{(e^{\sigma_V^2 T} - 1)(e^{\sigma_S^2 T} - 1)}}$$

$$\sigma_{BS} = \rho_{BS} \sigma_B \sigma_S$$

$$\sigma_{VB} = \rho_{VB} \sigma_V \sigma_B$$

$$\sigma_{VS} = \rho_{VS} \sigma_V \sigma_S$$

wherein:
  $S_n$ is a value of the equity of the firm at time n,
  $V_n$ is a value of the total assets of the firm at time n,
  $B_n$ is a value of the debt of the firm at time n,
  X is a face value of the firm's debt (B), which is assumed to be a single zero-coupon bond, at maturity,
  T is a user selected time horizon, in years,
  $r_V$ is a rate of return on the total assets of the firm, per annum,
  $\sigma_V$ is a standard deviation of rates of return on the total assets of the firm, per annum,
  $\sigma_S$ is a standard deviation of rates of return on the firm's equity, per annum,
  $\sigma_B$ is a standard deviation of rates of return on the firm's debt, per annum,
  values for $d_1$, $d_2$ and $d_3$ are calculated using the formula:

$$d_1 = ([\ln(V_0/X) + r_V T]/\sigma_V \sqrt{T}) + (1/2)(\sigma_V \sqrt{T}),$$

$$d_2 = d_1 - \sigma_V \sqrt{T},$$

$$d_3 = d_1 + \sigma_V \sqrt{T},$$

N( ) is the cumulative probability of the standard normal distribution with $d_1$, $d_2$ or $d_3$ as the upper limit;
prior to calculating values of the selected parameter or parameters, receiving such of the following that are necessary to undertake the calculations using the formula:
  the value of the equity of the firm at time n,
  the value of the total assets of the firm at time n,
  the value of the debt of the firm at time n,
  the face value of the firm's debt,
  the user selected time horizon, in years,
  the rate of return on the total assets of the firm, per annum,
  the standard deviation of rates of return on the total assets of the firm, per annum,
  the standard deviation of rates of return on the firm's equity, per annum,
  the standard deviation of rates of return on the firm's debt, per annum; and
using one or more of the values of the selected parameters so calculated to fit the option-theoretic model of the firm.

18. The computer implemented method of claim 11, further comprising the steps of:
  defining additional multi-variate equations representing relationships between variables, which comprise some or all of the inputs to and/or outputs from the model; and
  solving all of the multi-variate equations and the model to calculate revised values for the variables in the multi-variate equations and the model.

19. The computer implemented method of claim 18, wherein at least one of the variables included in one or more additional multi-variate equations comprises a statistical moment of one of the securities of the plurality of securities.

20. The computer implemented method of claim 18, wherein at least one of the variables included in one or more additional multi-variate equations comprises a correlation between the returns of a pair of securities of the plurality of securities.

21. The computer implemented method of claim 18, wherein at least one of the variables included in one or more additional multi-variate equations comprises a covariance between returns of a pair of securities of the plurality of securities.

22. The computer implemented method of claim 18, wherein at least one of the variables included in one or more additional multi-variate equations comprises a correlation between returns of a security of the plurality of securities and returns of total assets of the firm.

23. The computer implemented method of claim 18, wherein at least one of the variables included in one or more additional multi-variate equations comprises a covariance between returns of a security of the plurality of securities and returns of total assets of the firm.

24. The computer implemented method of claim 18, wherein at least one of the variables included in one or more additional multi-variate equations comprises an expected probability of default.

25. The computer implemented method of claim 18, wherein at least one of the variables included in one or more additional multi-variate equations comprises an expected loss given default on a debt-type of the plurality of securities.

26. The computer implemented method of claim 18, wherein at least one of the variables included in one or more additional multi-variate equations comprises an expected default loss on a debt-type security of the plurality of securities.

27. The computer implemented method of claim 11, further comprising the steps of generating one or more parameters from the model and solving the model so that the parameters equal values specified by the user, where one of the parameters is a statistical moment of returns of one of the plurality of securities.

28. The computer implemented method of claim 11, further comprising the steps of generating one or more parameters from the model and solving the model so that the parameters equal values specified by the user, where one of the parameters is a correlation between the returns of a pair of the plurality of securities.

29. The computer implemented method of claim 11, further comprising the steps of generating one or more parameters from the model and solving the model so that the parameters equal values specified by the user, where one of the parameters is a covariance between returns of a pair of the plurality of securities.

30. The computer implemented method of claim 11, further comprising the steps of generating one or more parameters from the model and solving the model so that the parameters equal values specified by the user, where one of the parameters is a correlation between returns of one of the plurality of securities and returns of total assets of the firm.

31. The computer implemented method of claim 11, further comprising the steps of generating one or more parameters from the model and solving the model so that the parameters equal values specified by the user, where one of the parameters is a covariance between returns of one of the plurality of securities and returns of total assets of the firm.

32. The computer implemented method of claim 11, further comprising the steps of generating one or more parameters from the model and solving the model so that the parameters equal values specified by a user, where one of the parameters is an expected probability of default.

33. The computer implemented method of claim 11, further comprising the steps of generating one or more parameters from the model and solving the model so that the parameters equal values specified by the user, where one of the parameters is an expected loss given default on a debt-type security of the plurality of securities.

34. The computer implemented method of claim 11, further comprising the steps of generating one or more parameters from the model and solving the model so that the parameters equal values specified by the user, where one of the parameters is an expected default loss on a debt-type security of the plurality of securities.

35. A computer implemented method for applying an option-theoretic model of a firm comprising the steps of:
　receiving, by one or more computers, one or more risk parameters, wherein the one or more risk parameters are related to the firm;
　specifying, by the one or more computers, one or more input parameters, wherein the one or more input parameters are to be used in the option-theoretic model of the firm;
　defining, by the one or more computers, mathematical relationships between the input parameters, wherein the mathematical relationships are a set of one or more equations for execution by the one or more computers;
　creating, by the one or more computers, the option-theoretic model of the firm, based on the defined mathematical relationships;
　receiving, by the one or more computers, at least one value for each of the one or more input parameters;
　calculating, by the one or more computers, using the option-theoretic model, an estimated value for one or more of the risk parameters, measured over a discrete time period;
　re-calculating, by the one or more computers, using the option-theoretic model, a solution, the solution comprising at least one estimated value for each of the one or more input parameters that a user allows to vary from the at least one received value, such that the at least one estimated risk parameter value from the model equals the at least one risk parameter value received by the one or more computers; and
　storing, by the one or more computers, the calculated option-theoretic model and the at least one estimated value of each of the one or more input parameters that the user allows to vary.

36. The computer implemented method of claim 35, wherein one of the risk parameters is a statistical moment of returns of one or more securities issued by, or referenced to, the firm.

37. The computer implemented method of claim 35, wherein one of the risk parameters is a correlation between returns of a pair of securities issued by, or referenced to, the firm.

38. The computer implemented method of claim 35, wherein one of the risk parameters is a covariance between returns of a pair of securities issued by, or referenced to, the firm.

39. The computer implemented method of claim 35, wherein one of the risk parameters is a correlation between returns of a security issued by, or referenced to, the firm and returns of total assets of the firm.

40. The computer implemented method of claim 35, wherein one of the risk parameters is a covariance between returns of a security issued by, or referenced to, the firm and returns of total assets of the firm.

41. The computer implemented method of claim 35 further comprising the steps of:
   receiving values for:
      a value of an equity of the firm at time n ($S_n$),
      a value of total assets of the firm at time n ($V_n$), wherein the value of total assets of the firm is a sum of values of a firm's debt ($B_n$) and equity ($S_n$),
      a face value (X) of the firm's debt (B), which is assumed to be a single zero-coupon bond, at maturity,
      a user selected time horizon, in years (T),
      a rate of return on the total assets of the firm, per annum ($r_V$),
      a rate of return on the firm's equity, per annum ($r_S$),
      a rate of return on the firm's debt, per annum ($r_B$),
      a standard deviation of rates of return on the total assets of the firm, per annum ($\sigma_V$),
   calculating a value for $d_1$, wherein:

$d_1 = ([\ln(V_0/X) + r_V T]/\sigma_V\sqrt{T}) + (1/2)(\sigma_V\sqrt{T})$, calculating a value for an instantaneous standard deviation of rates of return on the firm's debt, per annum ($\sigma_B$), using the formula:

$$\sigma_B = \sigma_V \frac{V_0}{B_0} e^{(r_V - r_B)T}[1 - N(d_1)]; \text{ and/or}$$

calculating a value for an instantaneous standard deviation of rates of return on the firm's equity, per annum ($\sigma_S$), using the formula:

$$\sigma_S = \sigma_V \frac{V_0}{S_0} e^{(r_V - r_S)T} N(d_1);$$

where N(•) is a cumulative probability of a standard normal distribution with $d_1$ as an upper limit; and
   using one or both said values of instantaneous standard deviation to fit the option-theoretic model of the firm.

42. The computer implemented method of claim 35 further comprising the steps of:
   receiving user selection of one or more of the following parameters, to be calculated over discrete time, for calibration with the model:
      a standard deviation of rates of return on a firm's debt, per annum ($\sigma_B$),
      a standard deviation of rates of return on a firm's equity, per annum ($\sigma_S$),
      a correlation of rates of return on the firm's debt and on the firm's equity ($\rho_{BS}$),
      a correlation of rates of return on total assets of the firm and on the firm's debt ($\rho_{VB}$),
      a correlation of rates of return on the total assets of the firm and on the firm's equity ($\rho_{VS}$),
      a covariance of rates of return on the firm's debt and on the firm's equity, per annum ($\sigma_{BS}$),
      a covariance of rates of return on the total assets of the firm and on the firm's debt, per annum ($\sigma_{VB}$),
      a covariance of rates of return on the total assets of the firm and on the firm's equity, per annum ($\sigma_{VS}$),
   calculating values for the one or more parameters so selected using one or more of the following formula:

$$\sigma_B = \sqrt{\ln\left(\frac{V_T^2[1 - N(d_3)]e^{\sigma_V^2 T} + X^2 N(d_2)}{B_T^2}\right) / T}$$

$$\sigma_S = \sqrt{\ln\left(\frac{V_T^2 N(d_3) e^{\sigma_V^2 T} - 2V_T X N(d_1) + X^2 N(d_2)}{S_T^2}\right) / T}$$

$$\rho_{BS} = \frac{X - B_T}{B_T \sqrt{(e^{\sigma_S^2 T} - 1)(e^{\sigma_B^2 T} - 1)}}$$

$$\rho_{VB} = \frac{V_T[1 - N(d_3)]e^{\sigma_V^2 T} + X N(d_1) - B_T}{B_T \sqrt{(e^{\sigma_V^2 T} - 1)(e^{\sigma_B^2 T} - 1)}}$$

$$\rho_{VS} = \frac{V_T N(d_3) e^{\sigma_V^2 T} - X N(d_1) - S_T}{S_T \sqrt{(e^{\sigma_V^2 T} - 1)(e^{\sigma_S^2 T} - 1)}}$$

$\sigma_{BS} = \rho_{BS}\sigma_B\sigma_S$
   $\sigma_{VB} = \rho_{VB}\sigma_V\sigma_B$
   $\sigma_{VS} = \rho_{VS}\sigma_V\sigma_S$ wherein:
      $S_n$ is a value of the equity of the firm at time n,
      $V_n$ is a value of the total assets of the firm at time n,
      $B_n$ is a value of the debt of the firm at time n,
      X is a face value of the firm's debt (B), which is assumed to be a single zero-coupon bond, at maturity,
      T is a user selected time horizon, in years,
      $r_V$ is a rate of return on the total assets of the firm, per annum,
      $\sigma_V$ is a standard deviation of rates of return on the total assets of the firm, per annum,
      $\sigma_S$ is a standard deviation of rates of return on the firm's equity, per annum,
      $\sigma_B$ is a standard deviation of rates of return on the firm's debt, per annum, values for $d_1$, $d_2$ and $d_3$ are calculated using the formula:

$d_1 = ([\ln(V_0/X) + r_V T]/\sigma_V\sqrt{T}) + (1/2)(\sigma_V\sqrt{T})$, $d_2 = d_1 - \sigma_V\sqrt{T}$, $d_3 = d_1 + \sigma_V\sqrt{T}$, N( ) is the cumulative probability of the standard normal distribution with $d_1$, $d_2$ or $d_3$ as the upper limit;
   prior to calculating values of the selected parameter or parameters, receiving such of the following that are necessary to undertake the calculations using the formula:
      the value of the equity of the firm at time n,
      the value of the total assets of the firm at time n,
      the value of the debt of the firm at time n,
      the face value of the firm's debt,
      the user selected time horizon, in years,
      the rate of return on the total assets of the firm, per annum,
      the standard deviation of rates of return on the total assets of the firm, per annum,
      the standard deviation of rates of return on the firm's equity, per annum, the standard deviation of rates of return on the firm's debt, per annum; and using one or more of the values of the selected parameters so calculated to fit the option-theoretic model of the firm.

43. A system for relating a price or value of a plurality of securities associated with an underlying asset, a rate of return on each of the plurality of securities, and risk attributes of each of the plurality of securities, the system comprising:

at least one processor; and at least one computer-readable memory communicatively coupled to the at least one processor, the memory storing processor-executable instructions that, when executed by the at least one processor, causes the system to perform operations comprising:

receiving data on a plurality of securities;

determining a risk premium incorporated in the rate of return for each of the plurality of securities, wherein the risk premium for each of the plurality of securities comprises a difference between the rate of return for that security and a risk free rate of return;

determining one or more priced risk factor premiums, wherein each of the priced risk factor premiums is a price per unit of risk for a priced risk factor multiplied by a measure of the security's exposure to that priced risk factor and wherein the risk premium for each of the securities is the priced risk factor premium, or, when the priced risk factor premium is part of a plurality of priced risk factor premiums, a sum of priced risk factor premiums; and wherein one of the priced risk factor premiums is in respect of volatility measured over a discrete time and wherein a price per unit of volatility is the same for two or more of each of the plurality of securities;

creating a model, wherein the model calculates at least one value based on the determined priced risk factor premium; and storing the determined priced risk factor premiums for the plurality of securities, the calculated model and the at least one value.

44. The computer system of claim 43, wherein at least one of said plurality of securities is a debt-type instrument, and the at least one memory further bears processor-executable instructions that, when executed on the at least one processor, cause the at least one processor to perform operations comprising:

analyzing a yield spread associated with the debt-type instrument and identify a default loss component and a risk premium component of said yield spread.

45. The computer system of claim 43, wherein the at least one memory further bears processor-executable instructions that, when executed on the at least one processor, cause the at least one processor to perform operations comprising:

fitting the model.

46. The computer system of claim 45, wherein the at least one memory further bears processor-executable instructions that, when executed on the at least one processor, cause the at least one processor to perform operations comprising: providing as output to a user, via the user interface, parameters of the fitted model.

47. The computer system of claim 43, wherein an estimate of the expected default loss of another security that is of a debt-type (security j) issued by, or referenced to, the firm, is utilised in analysing a rate of return for a security (or securities) issued by, or referenced to, a firm, and wherein the at least one memory further bears processor-executable instructions that, when executed on the at least one processor, cause the at least one processor to perform operations comprising:

determining the rate of return on security j ($r_j$) by reference to a promised yield on said security (y) and the expected default loss (EDL) on said security where $$r_j = y_j - EDL_j;$$

calculating a risk premium for said security j as equal to $r_j - r$, where r is the risk free rate of return;

calculating the exposure of each security to each priced risk factor (m);

calculating the price per unit of risk ($\lambda_m$) for each priced risk factor (m), wherein each $\lambda_m$ is the same for two or more securities issued by, or referenced to, a firm and wherein a sum of a product of the exposures for security j and the prices per unit of risk equals the risk premium for security j, and for any other security for which an estimate of its risk premium is available;

designating that one of the priced risk factors relates to the volatility, estimated over a discrete time period, of the rate of return on securities and is specific to securities issued by, or referenced to, the firm;

calculating a risk premium for all of the other securities, other than j, based at least partly on their exposure to each priced risk factor and the price per unit of risk for each risk factor;

fitting the model; and providing as output to a user parameters to the user from the fitted model.

48. The computer system of claim 47, wherein the priced risk factor analysed in the system comprises a volatility of returns, and wherein the at least one memory further bears processor-executable instructions that, when executed on the at least one processor, cause the at least one processor to perform operations comprising;

designating a relationship between a firm specific price of volatility risk ($\lambda_\sigma$), the rate of return for j ($r_j$), the volatility of returns ($\sigma_j$) and the risk free rate of return (r) as:

$$\lambda_\sigma = \frac{r_j - r}{\sigma_j};$$

designating a rate of return ($r_k$) on at least one class, of security (k) issued by, or referenced to, the firm as:

$$r_k r + \lambda_\sigma \sigma_k;$$

designating, where security class or classes k are debt-type securities, the default loss on said securities by combining the promised yield on said securities ($y_k$) and their rate of return ($r_k$) as follows:

$$EDL_k = y_k - r_k;$$

fitting the model; and providing as output to a user parameters of interest to the user from the fitted model.

49. The computer system of claim 43, wherein one or more of the plurality of securities being analysed by the system is an option, and wherein the at least one memory further bears processor-executable instructions that, when executed on the at least one processor, cause the at least one processor to perform operations comprising:

specifying a real world distribution process that returns on an underlying asset are expected to follow;

receiving pricing data on the option;

receiving adjustments for at least one factor specified by a user;

calculating an expected real world probability of the option being exercised based on the real world distribution process and the option's features;

calculating an expected mean of the option, at a time the option is expected to be exercised;

calculating the standard deviation and other higher moments of interest of the option, at the time the option is expected to be exercised;

using the expected mean value of the option, at the time the option is expected to be exercised, and the option's pricing data to calculate an expected real world pay off from the option;

discounting back to present value at a chosen evaluation date the expected real world pay off from the option using a risk adjusted discount rate, where said risk adjusted discount rate includes a priced risk factor premium for the expected standard deviation measured over discrete time of the expected real world pay off, for such other higher moments of interest to the user and adjustments for the at least one factor specified by the user, wherein the price per unit of risk, for each risk factor, is equated for two or more assets or securities selected from the options being discounted, the underlying asset and any other securities of interest referenced thereto; and providing as output to the user parameters from a fitted model.

50. The computer system of claim 49, wherein the at least one-memory further bears processor-executable instructions that, when executed on the at least one processor, cause the at least one processor to perform operations comprising:

using the estimated values for the rate of return, standard deviation, other higher moments of interest and any other factors specified by the user for the asset, derived as output from said claims, as input to price or value other options contingent on the same or similar assets.

51. The computer system of claim 49, wherein the at least one memory further bears processor-executable instructions that, when executed on the at least one processor, cause the at least one processor to perform operations comprising:

modelling the real world distribution process that the returns on the underlying asset are expected to follow as a specified statistical distribution, wherein the mean, standard deviation and other higher moments of interest of the portions of that distribution relevant to a security are estimated using closed-form type formula solutions or numerical approximations appropriate for the specified statistical distribution process.

52. The computer system of claim 51, wherein the at least one memory further bears processor-executable instructions that, when executed on the at least one processor, cause the at least one processor to perform operations comprising:

modelling the real world distribution process that the returns on the underlying asset are expected to follow as the normal distribution.

53. The computer system of claim 43, wherein the user applies an option-theoretic model of the firm, and wherein the at least one memory further bears processor-executable instructions that, when executed on the at least one processor, cause the at least one processor to perform operations comprising:

determining a plurality of input parameters, the parameters including a risk premium in the rate of return for each security issued by, or referenced to, the firm;

defining relationships between said parameters;

fitting the model; and providing as output to a user parameters from the fitted model.

54. The computer system of claim 53, wherein the at least one memory further bears processor-executable instructions that, when executed on the at least one processor, cause the at least one processor to perform operations comprising:

receiving pricing data on the securities issued by, or referenced to, the firm;

receiving adjustments for at least one factor specified by a user;

specifying a real world distribution process that returns on total assets of the firm are expected to follow;

specifying a default point representing a value of the total assets of the firm at which the firm is expected to default;

calculating an expected real world probability of the default point being met;

calculating an expected mean of the securities, based on a real world distribution process modelled for the total assets of the firm and the default point, at the time horizon of interest;

calculating a standard deviation and other higher moments of interest of the securities, based on a real world distribution process modelled for the total assets of the firm and the default point, at the time horizon of interest;

using the expected mean value of the securities, at the time horizon of interest, and the securities' pricing data to calculate an expected real world pay off of the securities, at the time horizon of interest;

discounting back to present value at a chosen evaluation date the expected pay offs of each security using a risk adjusted discount rate, where said risk adjusted discount rate includes a priced risk factor premium for the expected standard deviation of the expected pay off from the security, for such other higher moments of interest to the user and adjustments for the at least one factor specified by the user, wherein the price per unit of risk, for each such risk factor, is equated for two or more securities issued by, or referenced to, the firm;

fitting the model; and providing as output to a user parameters from the fitted model.

55. The computer system of claim 54, wherein the at least one memory further bears processor-executable instructions that, when executed on the at least one processor, cause the at least one processor to perform operations comprising:

modelling the real world distribution process that the returns on total assets of the firm are expected to follow as a specified statistical distribution, wherein the mean, standard deviation and other higher moments of interest of the portions of that distribution relevant to a security are estimated using closed-form type formula solutions or numerical approximations appropriate for the specified statistical distribution process.

56. The computer system of claim 55, wherein the at least one memory further bears processor-executable instructions that, when executed on the at least one processor, cause the at least one processor to perform operations comprising:

modelling the real world distribution process that the returns on total assets of the firm are expected to follow as the normal distribution.

57. The computer system of claim 56, wherein the firm has only a single class of zero coupon debt on issue and the at least one memory further bears processor-executable instructions that, when executed on the at least one processor, cause the at least one processor to perform operations comprising:

receiving values for:
- a value of an equity of the firm at time n ($S_n$),
- a value of total assets of the firm at time n ($V_n$), wherein the value of the total assets of the firm is a sum of values of a firm's debt ($B_n$) and equity ($S_n$),
- a face value (X) of the firm's debt (B), which is assumed to be a single zero-coupon bond, at maturity,
- a user selected time horizon, in years (T),
- a rate of return on the total assets of the firm, per annum ($r_V$),
- a promised yield on the firm's debt, per annum (y),
- a risk free rate of return, per annum (r),
- a standard deviation of rates of return on the total assets of the firm, per annum ($\sigma_V$),
- a standard deviation of rates of return on the firm's debt, per annum ($\sigma_B$),
- a standard deviation of rates of return on the firm's equity, per annum ($\sigma_S$);

calculating values for $d_1$ and $d_2$, wherein:

$$d_1 = ([\ln(V_0/X) + r_V T]/\sigma_V \sqrt{T}) + (1/2)(\sigma_V \sqrt{T}),$$

$$d_2 = d_1 - \sigma_V \sqrt{T};$$

calculating values for:

$$\frac{\ln\frac{V_0 e^{r_V T}[1 - N(d_1)] + B_0 e^{yT} N(d_2)}{B_0} \Big/ T - r}{\sigma_B}, \text{ and}$$

$$\frac{\ln\left(\frac{V_0 e^{r_V T} N(d_1) - B_0 e^{yT} N(d_2)}{S_0}\right) \Big/ T - r}{\sigma_S}$$

where N(•) is a cumulative probability of a standard normal distribution with $d_1$ or $d_2$ as the upper limit; and fitting the model such that:

$$\frac{\ln\left(\frac{V_0 e^{r_V T}[1 - N(d_1)] + B_0 e^{yT} N(d_2)}{B_0}\right) \Big/ T - r}{\sigma_B} = \frac{\ln\left(\frac{V_0 e^{r_V T} N(d_1) - B_0 e^{yT} N(d_2)}{S_0}\right) \Big/ T - r}{\sigma_S}.$$

58. The computer system of claim 53, wherein the at least one memory further bears processor-executable instructions that, when executed on the at least one processor, cause the at least one processor to perform operations comprising:
- defining additional multi-variate equations representing relationships between variables, which comprise some or all of the inputs to and/or outputs in the claim; and
- solving all of the multi-variate equations and the model used in the claim, to calculate revised values for the variables in the multi-variate equations and the model.

59. The computer system of claim 58, wherein the at least one memory further bears processor-executable instructions that, when executed on the at least one processor, cause the at least one processor to perform operations comprising:
- including as at least one of the variables in one or more additional multi-variate equations a statistical moment of one of the securities issued by, or referenced to the firm.

60. The computer system of claim 58, wherein the at least one memory further bears processor-executable instructions that, when executed on the at least one processor, cause the at least one processor to perform operations comprising:
- including as at least one of the variables in one or more additional multi-variate equations the correlation between the returns of a pair of securities issued by, or referenced to, the firm.

61. The computer system of claim 58, wherein the at least one memory further bears processor-executable instructions that, when executed on the at least one processor, cause the at least one processor to perform operations comprising:
- including as at least one of the variables in one or more additional multi-variate equations the covariance between the returns of a pair of securities issued by, or referenced to, the firm.

62. The computer system of claim 58, wherein the at least one memory further bears processor-executable instructions that, when executed on the at least one processor, cause the at least one processor to perform operations comprising:
- including as at least one of the variables in one or more additional multi-variate equations the correlation between the returns of a security issued by, or referenced to, the firm and the returns of total assets of the firm.

63. The computer system of claim 58, wherein the at least one memory further bears processor-executable instructions that, when executed on the at least one processor, cause the at least one processor to perform operations comprising:
- including as at least one of the variables in one or more additional multi-variate equations the covariance between the returns of a security issued by, or referenced to, the firm and the returns of total assets of the firm the total firm.

64. The computer system of claim 58, wherein the at least one memory further bears processor-executable instructions that, when executed on the at least one processor, cause the at least one processor to perform operations comprising:
- including as at least one of the variables in one or more additional multi-variate equations the expected probability of default.

65. The computer system of claim 58, wherein the at least one memory further bears processor-executable instructions that, when executed on the at least one processor, cause the at least one processor to perform operations comprising:
- including as at least one of the variables in one or more additional multi-variate equations the expected loss given default on a debt-type security issued by, or referenced to, the firm.

66. The computer system of claim 58, wherein the at least one memory further bears processor-executable instructions that, when executed on the at least one processor, cause the at least one processor to perform operations comprising:
- including as at least one of the variables in one or more additional multi-variate equations the expected default loss on a debt-type security issued by, or referenced to, the firm.

67. The computer system of claim 53, wherein the at least one memory further bears processor-executable instructions that, when executed on the at least one processor, cause the at least one processor to perform operations comprising:
- generating one or more parameters from the model and solving the model so that the parameters equal values specified by a user, where one of the parameters is a statistical moment of the returns of one of the securities issued by, or referenced to, the firm.

68. The computer system of claim 53, wherein the at least one memory further bears processor-executable instructions that, when executed on the at least one processor, cause the at least one processor to perform operations comprising:

generating one or more parameters from the model and solving the model so that the parameters equal values specified by a user, where one of the parameters is the correlation between the returns of a pair of securities issued by, or referenced to, the firm.

69. The computer system of claim 53, wherein the at least one memory further bears processor-executable instructions that, when executed on the at least one processor, cause the at least one processor to perform operations comprising:

generating one or more parameters from the model and solving the model so that the parameters equal values specified by a user, where one of the parameters is the covariance between the returns of a pair of securities issued by, or referenced to, the firm.

70. The computer system of claim 53, wherein the at least one memory further bears processor-executable instructions that, when executed on the at least one processor, cause the at least one processor to perform operations comprising:

generating one or more parameters from the model and solving the model so that the parameters equal values specified by a user, where one of the parameters is the correlation between the returns of a security issued by, or referenced to, the firm and the returns of total assets of the firm.

71. The computer system of claim 53, wherein the at least one memory further bears processor-executable instructions that, when executed on the at least one processor, cause the at least one processor to perform operations comprising:

generating one or more parameters from the model and solving the model so that the parameters equal values specified by a user, where one of the parameters is the covariance between the returns of a security issued by, or referenced to, the firm and the returns of total assets of the firm.

72. The computer system of claim 53, wherein the at least one memory further bears processor-executable instructions that, when executed on the at least one processor, cause the at least one processor to perform operations comprising:

generating one or more parameters from the model and solving the model so that the parameters equal values specified by a user, where one of the parameters is the expected probability of default.

73. The computer system of claim 53, wherein the at least one memory further bears processor-executable instructions that, when executed on the at least one processor, cause the at least one processor to perform operations comprising:

generating one or more parameters from the model and solving the model so that the parameters equal values specified by a user, where one of the parameters is the expected loss given default on a debt-type security issued by, or referenced to, the firm.

74. The computer system of claim 53, wherein the at least one memory further bears processor-executable instructions that, when executed on the at least one processor, cause the at least one processor to perform operations comprising:

generating one or more parameters from the model and solving the model so that the parameters equal values specified by a user, where one of the parameters is the expected default loss on a debt-type security issued by, or referenced to, the firm.

75. The computer system of claim 53, wherein the at least one memory further bears processor-executable instructions that, when executed on the at least one processor, cause the at least one processor to perform operations comprising:

receiving values for:

a value of an equity of the firm at time n ($S_n$), a value of total assets of the firm at time n ($V_n$), wherein the value of total assets of the firm is a sum of values of a firm's debt ($B_n$) and equity ($S_n$), a face value (X) of the firm's debt (B), which is assumed to be a single zero-coupon bond, at maturity, a user selected time horizon, in years (T), a rate of return on the total assets of the firm, per annum ($r_V$), a promised yield on the firm's debt, per annum ($r_S$), a risk free rate of return, per annum ($r_B$), a standard deviation of rates of return on the total assets of the firm, per annum ($\sigma_V$), calculating a value for $d_1$, wherein:

$$d_1 = ([\ln(V_0/X) + r_V T]/\sigma_V \sqrt{T}) + (1/2)(\sigma_V \sqrt{T}),$$

calculating a value for an instantaneous standard deviation of rates of return on the firm's debt, per annum ($\sigma_B$), using the formula:

$$\sigma_B = \sigma_V \frac{V_0}{B_0} e^{(r_V - r_B)T}[1 - N(d_1)]; \text{ and/or}$$

calculating a value for an instantaneous standard deviation of rates of return on the firm's equity, per annum ($\sigma_S$), using the formula:

$$\sigma_S = \sigma_V \frac{V_0}{S_0} e^{(r_V - r_S)T} N(d_1);$$

where N(•) is a cumulative probability of a standard normal distribution with $d_1$ as an upper limit; and using one or both said values of instantaneous standard deviation to fit the option-theoretic model of the firm.

76. The computer system of claim 53, wherein the at least one memory further bears processor-executable instructions that, when executed on the at least one processor, cause the at least one processor to perform operations comprising:

receiving user selection of one or more of the following parameters, to be calculated over discrete time, for calibration with the model:

a standard deviation of rates of return on a firm's debt, per annum ($\sigma_B$), a standard deviation of rates of return on a firm's equity, per annum ($\sigma_S$), a correlation of rates of return on the firm's debt and on the firm's equity ($\rho_{BS}$), a correlation of rates of return on total assets of the firm and on the firm's debt ($\rho_{VS}$), a correlation of rates of return on the total assets of the firm and on the firm's equity ($\rho_{VB}$), a covariance of rates of return on the firm's debt and on the firm's equity, per annum ($\sigma_{BS}$), a covariance of rates of return on the total assets of the firm and on the firm's debt, per annum ($\sigma_{VB}$), a covariance of rates of return on the total assets of the firm and on the firm's equity, per annum ($\sigma_{VS}$), calculating values for the one or more parameters so selected using one or more of the following formula:

$$\sigma_B = \sqrt{\ln\left(\frac{V_T^2[1-N(d_3)]e^{\sigma_V^2 T} + X^2 N(d_2)}{B_T^2}\right)/T}$$

$$\sigma_S = \sqrt{\ln\left(\frac{V_T^2 N(d_3)e^{\sigma_V^2 T} - 2V_T X N(d_1) + X^2 N(d_2)}{S_T^2}\right)/T}$$

$$\rho_{BS} = \frac{X - B_T}{B_T\sqrt{(e^{\sigma_S^2 T} - 1)(e^{\sigma_B^2 T} - 1)}}$$

$$\rho_{VB} = \frac{V_T[1 - N(d_3)]e^{\sigma_V^2 T} + X N(d_1) - B_T}{B_T\sqrt{(e^{\sigma_V^2 T} - 1)(e^{\sigma_B^2 T} - 1)}}$$

$$\rho_{VS} = \frac{V_T N(d_3)e^{\sigma_V^2 T} - X N(d_1) - S_T}{S_T\sqrt{(e^{\sigma_V^2 T} - 1)(e^{\sigma_S^2 T} - 1)}}$$

$$\sigma_{BS} = \rho_{BS}\sigma_B\sigma_S$$

$$\sigma_{VB} = \rho_{VB}\sigma_V\sigma_B$$

$$\sigma_{VS} = \rho_{VS}\sigma_V\sigma_S$$

wherein:
$S_n$ is a value of the equity of the firm at time n,
$V_n$ is a value of the total assets of the firm at time n,
$B_n$ is a value of the debt of the firm at time n,
X is a face value of the firm's debt (B), which is assumed to be a single zero-coupon bond, at maturity,
T is a user selected time horizon, in years,
$r_V$ is a rate of return on the total assets of the firm, per annum,
$\sigma_V$ is a standard deviation of rates of return on the total assets of the firm, per annum,
$\sigma_S$ is a standard deviation of rates of return on the firm's equity, per annum,
$\sigma_B$ is a standard deviation of rates of return on the firm's debt, per annum, values for $d_1$, $d_2$ and $d_3$ are calculated using the formula:

$$d_1 = ([\ln(V_0/X) + r_V T]/\sigma_V\sqrt{T}) + (1/2)(\sigma_V\sqrt{T}),$$

$$d_2 = d_1 - \sigma_V\sqrt{T},$$

$$d_3 = d_1 + \sigma_V\sqrt{T},$$

N( ) is the cumulative probability of the standard normal distribution with $d_1$, $d_2$ or $d_3$ as the upper limit;
prior to calculating values of the selected parameter or parameters, receiving such of the following that are necessary to undertake the calculations using the formula:
the value of the equity of the firm at time n,
the value of the total assets of the firm at time n,
the value of the debt of the firm at time n,
the face value of the firm's debt,
the user selected time horizon, in years,
the rate of return on the total assets of the firm, per annum,
the standard deviation of rates of return on the total assets of the firm, per annum,
the standard deviation of rates of return on the firm's equity, per annum,
the standard deviation of rates of return on the firm's debt, per annum; and
using one or more of the values of the selected parameters so calculated to fit the option-theoretic model of the firm.

77. A system for applying an option-theoretic model of a firm, the system comprising:
at least one processor; and
at least one computer-readable memory communicatively coupled to the at least one processor, the memory storing processor-executable instructions that, when executed by the at least one processor, causes the system to perform operations comprising:
receiving one or more risk parameters, wherein the one or more risk parameters are related to the firm;
specifying one or more input parameters, wherein the one or more input parameters are to be used in the option-theoretic model of the firm;
defining mathematical relationships between the input parameters, wherein the mathematical relationships are a set of one or more equations for;
creating, the option-theoretic model of the firm, based on the defined mathematical relationships;
receiving at least one value for each of the one or more input parameters;
calculating using the option-theoretic model, an estimated value for one or more of the risk parameters, measured over a discrete time period;
re-calculating using the option-theoretic model, a solution, the solution comprising at least one estimated value for each of the one or more input parameters that a user allows to vary from the at least one received value, such that the at least one estimated risk parameter value from the model equals the at least one risk parameter value received; and
storing the calculated option-theoretic model and the at least one estimated value of each of the one or more input parameters that the user allows to vary.

78. The computer system of claim 77, wherein the at least one memory further bears processor-executable instructions that, when executed on the at least one processor, cause the at least one processor to perform operations comprising:
using as one of the risk parameters a statistical moment of returns of one or more securities issued by, or referenced to, the firm.

79. The computer system of claim 77, wherein the at least one memory further bears processor-executable instructions that, when executed on the at least one processor, cause the at least one processor to perform operations comprising:
using as one of the risk parameters a correlation between returns of a pair of securities issued by, or referenced to, the firm.

80. The computer system of claim 77, wherein the memory further bears processor-executable instructions that, when executed on the at least one processor, cause the at least one processor to perform operations comprising:
using as one of the risk parameters a covariance between returns of a pair of securities issued by, or referenced to, the firm.

81. The computer system of claim 77, wherein the at least one memory further bears processor-executable instructions that, when executed on the at least one processor, cause the at least one processor to perform operations comprising:
using as one of the risk parameters a correlation between returns of a security issued by, or referenced to, the firm and returns of total assets of the firm.

82. The computer system of claim 77, wherein the at least one memory further bears processor-executable instructions that, when executed on the at least one processor, cause the at least one processor to perform operations comprising:

using as one of the risk parameters a covariance between returns of a security issued by, or referenced to, the firm and returns of the total assets of the firm.

83. The computer system of claim 77, wherein the at least one memory further bears processor-executable instructions that, when executed on the at least one processor, cause the at least one processor to perform operations comprising:

receiving values for:
- a value of the equity of the firm at time n ($S_n$),
- a value of total assets of the firm at time n ($V_n$), wherein the value of total assets of the firm is a sum of values of a firm's debt ($B_n$) and equity ($S_n$),
- a face value (X) of the firm's debt (B), which is assumed to be a single zero-coupon bond, at maturity,
- a user selected time horizon, in years (T),
- a rate of return on the total assets of the firm, per annum ($r_V$),
- a rate of return on the firm's equity, per annum ($r_S$),
- a rate of return on the firm's debt, per annum ($r_B$),
- a standard deviation of rates of return on the total assets of the firm, per annum ($\sigma_V$), calculating a value for $d_1$, wherein:

$$d_1 = ([\ln(V_0/X) + r_V T]/\sigma_V \sqrt{T}) + (1/2)(\sigma_V \sqrt{T}),$$

calculating a value for an instantaneous standard deviation of rates of return on the firm's debt, per annum ($\sigma_B$), using the formula:

$$\sigma_B = \sigma_V \frac{V_0}{B_0} e^{(r_V - r_B)T} [1 - N(d_1)]; \text{ and/or}$$

calculating a value for an instantaneous standard deviation of rates of return on the firm's equity, per annum ($\sigma_S$), using the formula:

$$\sigma_S = \sigma_V \frac{V_0}{S_0} e^{(r_V - r_S)T} N(d_1);$$

where N(•) is a cumulative probability of a standard normal distribution with as an upper limit; and
using one or both said values of instantaneous standard deviation to fit the option-theoretic model of the firm.

84. The computer system of claim 77, wherein the at least one memory further bears processor-executable instructions that, when executed on the at least one processor, cause the at least one processor to perform operations comprising:

receiving user selection of one or more of the following parameters, to be calculated over discrete time, for calibration with the model:
- a standard deviation of rates of return on a firm's debt, per annum ($\sigma_B$),
- a standard deviation of rates of return on a firm's equity, per annum ($\sigma_S$),
- a correlation of rates of return on the firm's debt and on the firm's equity ($\rho_{BS}$),
- a correlation of rates of return on total assets of the firm and on the firm's debt ($\rho_{VS}$)
- a correlation of rates of return on the total assets of the firm and on the firm's equity ($\rho_{VS}$),
- a covariance of rates of return on the firm's debt and on the firm's equity, per annum ($\sigma_{BS}$),
- a covariance of rates of return on the total assets of the firm and on the firm's debt, per annum ($\sigma_{VS}$),
- a covariance of rates of return on the total assets of the firm and on the firm's equity, per annum ($\sigma_{VS}$), calculating values for the one or more parameters so selected using one or more of the following formula:

$$\sigma_B = \sqrt{\ln\left(\frac{V_T^2[1-N(d_3)]e^{\sigma_V^2 T} + X^2 N(d_2)}{B_T^2}\right)/T}$$

$$\sigma_S = \sqrt{\ln\left(\frac{V_T^2 N(d_3)e^{\sigma_V^2 T} - 2V_T X N(d_1) + X^2 N(d_2)}{S_T^2}\right)/T}$$

$$\rho_{BS} = \frac{X - B_T}{B_T \sqrt{(e^{\sigma_S^2 T} - 1)(e^{\sigma_B^2 T} - 1)}}$$

$$\rho_{VB} = \frac{V_T[1-N(d_3)]e^{\sigma_V^2 T} + XN(d_1) - B_T}{B_T \sqrt{(e^{\sigma_V^2 T} - 1)(e^{\sigma_B^2 T} - 1)}}$$

$$\rho_{VS} = \frac{V_T N(d_3)e^{\sigma_V^2 T} - XN(d_1) - S_T}{S_T \sqrt{(e^{\sigma_V^2 T} - 1)(e^{\sigma_S^2 T} - 1)}}$$

$$\sigma_{BS} = \rho_{BS} \sigma_B \sigma_S$$

$$\sigma_{VB} = \rho_{VB} \sigma_V \sigma_B$$

$$\sigma_{VS} = \rho_{VS} \sigma_V \sigma_S$$

wherein:
- $S_n$ is a value of the equity of the firm at time n,
- $V_n$ is a value of the total assets of the firm at time n,
- $B_n$ is a value of the debt of the firm at time n,
- X is a face value of the firm's debt (B), which is assumed to be a single zero-coupon bond, at maturity,
- T is a user selected time horizon, in years,
- $r_V$ is a rate of return on the total assets of the firm, per annum,
- $\sigma_V$ is a standard deviation of rates of return on the total assets of the firm, per annum,
- $\sigma_S$ is a standard deviation of rates of return on the firm's equity, per annum,
- $\sigma_B$, is a standard deviation of rates of return on the firm's debt, per annum, values for $d_1$, $d_2$ and $d_3$ are calculated using the formula:

$$d_1 = ([\ln(V_0/X) + r_V T]/\sigma_V \sqrt{T}) + (1/2)(\sigma_V \sqrt{T}),$$

$$d_2 = d_1 - \sigma_V \sqrt{T},$$

$$d_3 = d_1 + \sigma_V \sqrt{T},$$

N( ) is the cumulative probability of the standard normal distribution with $d_1$, $d_2$ or $d_3$ as the upper limit;

prior to calculating values of the selected parameter or parameters, receiving such of the following that are necessary to undertake the calculations using the formula:
- the value of the equity of the firm at time n,
- the value of the total assets of the firm at time n,
- the value of the debt of the firm at time n,
- the face value of the firm's debt,
- the user selected time horizon, in years,
- the rate of return on the total assets of the firm, per annum, the standard deviation of rates of return on the total assets of the firm, per annum, the standard deviation of rates of return on the firm's equity, per annum, the standard deviation of rates of return on the firm's debt, per annum; and using one or more of the values of the selected parameters so calculated to fit the option-theoretic model of the firm.

85. A non-transitory computer-readable medium for relating a price or value of a plurality of securities associated with an underlying asset, a rate of return on each of the plurality of securities, and risk attributes of each of the plurality of securities, storing computer-executable instructions that, upon execution by one or more computers, cause the one or more computers to perform operations comprising:

receiving data on a plurality of securities;

determining a risk premium incorporated in the rate of return for each of the plurality of securities, wherein the risk premium for each of the plurality of securities comprises a difference between the rate of return for that security and a risk free rate of return;

determining one or more priced risk factor premiums, wherein each of the priced risk factor premiums is a price per unit of risk for a priced risk factor multiplied by a measure of the security's exposure to that priced risk factor and wherein the risk premium for each of the securities is the priced risk factor premium, or, when the priced risk factor premium is part of a plurality of priced risk factor premiums, a sum of priced risk factor premiums; and wherein one of the priced risk factor premiums is in respect of volatility measured over a discrete time and wherein a price per unit of volatility is the same for two or more of each of the plurality of securities;

creating a model, wherein the model calculates at least one value based on the determined price risk factor premium; and storing the determined price risk factor premiums for the plurality of securities, the calculated model and the at least one value.

86. The non-transitory computer-readable medium of claim 85, wherein at least one of said plurality of securities is a debt-type instrument, and further bearing computer-executable instructions that, upon execution by the computer, cause the computer to perform operations comprising:

analysing a yield spread associated with the debt-type instrument and identifying a default loss component and a risk premium component of the yield spread.

87. The non-transitory computer-readable medium of claim 85, further-bearing computer-executable instructions that, upon execution by the computer, cause the computer to perform operations comprising:

fitting the model.

88. The non-transitory computer-readable medium of claim 87, further bearing computer-executable instructions that, upon execution by the computer, cause the computer to perform operations comprising:

outputting to a user parameters of the fitted model.

89. The non-transitory computer-readable medium of claim 85, further comprising computer-executable instructions for utilising an estimate of the expected default loss of another security that is of a debt-type (security j) issued by, or referenced to, the firm, in analysing the rate of return for a security (or securities) issued by, or referenced to, a firm, said computer-executable instructions, upon execution by the computer, causing the computer to perform operations comprising:

determining the a rate of return on security j ($r_j$) by reference to the promised yield on said security ($y_j$) and the expected default loss ($EDL_j$) on said security where:

$$r_j = y_j - EDL_j$$

calculating the risk premium for said security j as equal to $r_j-r$, where r is the a risk free rate of return;

calculating the exposure of each security to each priced risk factor (m);

calculating a price per unit of risk ($\lambda_m$) for each priced risk factor (m), wherein each $\lambda_m$ is the same for two or more securities issued by, or referenced to, a firm and such that a sum of a product of the risk exposures for security j and the prices per unit of risk equals the risk premium for security j, and similarly for any other security for which an estimate of its risk premium is available;

designating that one of the priced risk factors relates to the volatility, estimated over a discrete time period, of the rate of return on securities and is specific to securities issued by, or referenced to, the firm;

calculating the risk premium of return for all of the other securities being analysed, other than j, based at least partly on their exposure to each priced risk factor and the price per unit of risk for each risk factor;

fitting the model; and providing as output to a user parameters of interest to the user from the fitted model.

90. The non-transitory computer-readable medium of claim 89, wherein the only priced risk factor analysed in accordance with the computer-executable instructions is the volatility of returns and the computer-executable instructions, upon execution by the computer, cause the computer to perform operations comprising:

designating the relationship between the firm specific price of volatility risk ($\lambda_\sigma$), the rate of return for j ($r_j$), the volatility of returns for j ($\sigma_j$) and the risk free rate of return (r) as:

$$\lambda_\sigma = \frac{r_j - r}{\sigma_j}$$

designating the rate of return ($r_k$) on another class, or classes, of security (k) issued by, or referenced to, the firm as:

$$r_k = r + \lambda_\sigma \sigma_k$$

designating, where security class or classes k are debt-type securities, the default loss on said securities by combining the promised yield on said securities ($y_k$) and their rate of return ($r_k$) as follows:

$$EDL_k = y_k - r_k$$

fitting the model; and providing as output to a user parameters of interest to the user from the fitted model.

91. The non-transitory computer-readable medium of claim 85, wherein one or more of the securities being analysed with the computer-executable instructions is an option, and further bearing computer executable instructions that, upon execution by the computer, cause the computer to perform operations comprising:

specifying the real world distribution process that the returns on the underlying asset are expected to follow;

receiving data on features of the option;

receiving adjustments for any factors specified by a user;

calculating the expected real world probability of the option being exercised based on the real world distribution process and the option's features;

calculating the an expected mean, standard deviation and other higher moments of interest of the option, at the time the option is expected to be exercised;

using the expected mean value of the option, at the time the option is expected to be exercised, and the option's features to calculate the expected real world pay off from the option;

discounting back to present value (as at the chosen evaluation date) the pay off from the option using a risk adjusted discount rate, where said risk adjusted discount rate includes a priced risk factor premium for the expected standard deviation (measured over discrete time) of the expected option pay off, for such other higher moments of interest to the user and adjustments for any other factors specified by a user, wherein the price per unit of risk, for each risk factor, is equated for two or more assets or securities selected from the options being evaluated, the underlying asset and any other securities of interest referenced thereto; and providing as output to a user parameters of interest to the user from the fitted model.

92. The non-transitory computer-readable medium of claim 91, further bearing computer-executable instructions that, upon execution by the computer, cause the computer to perform operations comprising:

using the estimated values for the rate of return, standard deviation, other higher moments of interest and any other factors specified by a user for the asset, derived as output from said claims, as input to price or value other options contingent on the same or similar assets.

93. The non-transitory computer-readable medium of claim 91, wherein computer-executable instructions, upon execution by the computer, cause the computer to model the real world distribution process that the returns on the underlying asset are expected to follow as a specified statistical distribution, wherein the expected mean, the expected standard deviation and other higher moments of interest of the portions of that distribution relevant to the one or more of the plurality of securities are estimated using closed-form type formula solutions or numerical approximations appropriate for the specified distribution process.

94. The non-transitory computer-readable medium of claim 93, wherein the computer-executable instructions, upon execution by the computer, cause the computer to model the real world distribution process that returns on the underlying asset are expected to follow is a normal distribution.

95. The non-transitory computer-readable medium of claim 85, wherein a user applies an option-theoretic model of the firm and further bearing computer-executable instructions that, upon execution by the computer, cause the computer to perform operations comprising:

determining a plurality of input parameters, the parameters including a risk premium in the rate of return for each security issued by, or referenced to, the firm;

defining relationships between said parameters;

fitting the model; and providing as output to a user parameters of interest to the user from the fitted model.

96. The non-transitory computer-readable medium of claim 95, further bearing computer-executable instructions that, upon execution by the computer, cause the computer to perform operations comprising:

receiving pricing data on the securities;

receiving adjustments for at least one factor specified by a user;

specifying a real world distribution process that returns on total assets of the firm are expected to follow;

specifying a default point representing a value of the total assets of the firm at which the firm is expected to default;

calculating an expected real world probability of the default point being met;

calculating an expected mean, an expected standard deviation and other higher moments of interest of the securities, based on a real world distribution process modelled for the total assets of the firm and the default point, at the time horizon of interest;

using the expected mean value of the securities, at the time horizon of interest, and the securities' pricing data to calculate an expected real world pay off of the securities, at the time horizon of interest;

discounting back to present value at a chosen evaluation date the expected pay offs of each security using a risk adjusted discount rate, where said risk adjusted discount rate includes a priced risk factor premium for the expected standard deviation of the expected pay off from the security, for such other higher moments of interest to the user and adjustments for the at least one factor specified by the user, wherein the price per unit of risk, for each such risk factor, is equated for two or more securities issued by, or referenced to, the firm;

fitting the model; and providing as output to a user parameters from the fitted model.

97. The non-transitory computer-readable medium of claim 96, wherein computer-executable instructions, upon execution by the computer, cause the computer to model the real world distribution process that returns on the total assets of the firm are expected to follow as a specified statistical distribution, wherein the expected mean, the expected standard deviation and other higher moments of interest of the portions of that distribution relevant to a security of the plurality of securities are estimated using closed-form type formula solutions or numerical approximations appropriate for the specified statistical distribution process.

98. The non-transitory computer-readable medium of claim 97, wherein the computer-executable instructions, upon execution by the computer, cause the computer to model the real world distribution process that returns on the total assets of the firm are expected to follow is a normal distribution.

99. The non-transitory computer-readable medium of claim 98, wherein the firm has, or is treated as having, only a single class of zero coupon debt on issue, and further bearing computer-executable instructions that, upon execution by the computer, cause the computer to perform operations comprising:

receiving values for:
  a value of an equity of a firm at time n ($S_n$),
  a value of the total assets of the firm at time n ($V_n$), wherein the value of the total assets of the firm is a sum of values of a firm's debt ($B_n$) and equity ($S_n$),
  a face value (X) of the firm's debt (B), which is assumed to be a single zero-coupon bond, at maturity,
  a user selected time horizon, in years (T),
  a rate of return on the total assets of the firm, per annum ($r_V$),
  a promised yield on the firm's debt, per annum (y),
  a risk free rate of return, per annum (r), a standard deviation of rates of return on the total assets of the firm, per annum ($\sigma_V$), a standard deviation of rates of return on the firm's debt, per annum ($\sigma_B$), a standard deviation of rates of return on the firm's equity, per annum ($\sigma_S$);

calculating values for $d_1$ and $d_2$, wherein:

$$d_1 = ([\ln(V_0/X) + r_V T]/\sigma_V \sqrt{T}) + (1/2)(\sigma_V \sqrt{T}),$$

$$d_2 = d_1 - \sigma_V \sqrt{T};$$

calculating values for:

$$\frac{\ln \frac{V_0 e^{r_V T}[1 - N(d_1)] + B_0 e^{yT} N(d_2)}{B_0} \big/ T - r}{\sigma_B}, \text{ and}$$

$$\frac{\ln \left( \frac{V_0 e^{r_V T} N(d_1) - B_0 e^{yT} N(d_2)}{S_0} \right) \big/ T - r}{\sigma_S}$$

where N(•) is a cumulative probability of a standard normal distribution with $d_1$ or $d_2$ as an upper limit; and fitting the model such that:

$$\frac{\ln \left( \frac{V_0 e^{r_V T}[1 - N(d_1)] + B_0 e^{yT} N(d_2)}{B_0} \right) \big/ T - r}{\sigma_B} = \frac{\ln \left( \frac{V_0 e^{r_V T} N(d_1) - B_0 e^{yT} N(d_2)}{S_0} \right) \big/ T - r}{\sigma_S}.$$

100. The non-transitory computer-readable medium of claim 95, further bearing computer-executable instructions that, upon execution by the computer, cause the computer to perform operations comprising:

defining additional multi-variate equations representing relationships between variables, which comprise some or all of the inputs to and/or outputs from the model; and solving all of the multi-variate equations and the model to calculate revised values for the variables in the multi-variate equations and the model.

101. The non-transitory computer-readable medium of claim 100, wherein the computer-executable instructions include as at least one of the variables included in one or more additional multi-variate equations a statistical moment of one of the securities of the plurality of securities.

102. The non-transitory computer-readable medium in claim 100, wherein the computer-executable instructions include as at least one of the variables included in one or more additional multi-variate equations comprises a correlation between returns of a pair of securities of the plurality of securities.

103. The non-transitory computer-readable medium of claim 100, wherein the computer-executable instructions include as at least one of the variables included in one or more additional multi-variate equations comprises a covariance between returns of a pair of securities of the plurality of securities.

104. The non-transitory computer-readable medium of claim 100, wherein the computer-executable instructions include as at least one of the variables included in one or more additional multi-variate equations comprises a correlation between returns of a security of the plurality of securities and returns of total assets of the firm.

105. The non-transitory computer-readable medium of claim 100, wherein the computer-executable instructions include as at least one of the variables included in one or more additional multi-variate equations comprises a covariance between returns of a security of the plurality of securities and returns of total assets of the firm.

106. The non-transitory computer-readable medium of claim 100, wherein the computer-executable instructions include as at least one of the variables included in one or more additional multi-variate equations comprises an expected probability of default.

107. The non-transitory computer-readable medium of claim 100, wherein the computer-executable instructions include as at least one of the variables included in one or more additional multi-variate equations comprises an expected loss given default on a debt-type security of the plurality of securities.

108. The non-transitory computer-readable medium of claim 100, wherein the computer-executable instructions include as at least one of the variables included in one or more additional multi-variate equations comprises an expected default loss on a debt-type security of the plurality of securities.

109. The non-transitory computer-readable medium of claim 95, wherein the computer-executable instructions, upon execution by the computer, cause the computer to generate one or more parameters from the model and solve the model so that the parameters equal values specified by the user, where one of the parameters is a statistical moment of returns of one of the plurality of securities.

110. The non-transitory computer-readable medium of claim 95, wherein the computer-executable instructions, upon execution by the computer, cause the computer to generate one or more parameters from the model and solve the model so that the parameters equal values specified by the user, where one of the parameters is a correlation between returns of a pair of the plurality of securities.

111. The non-transitory computer-readable medium of claim 95, wherein the computer-executable instructions, upon execution by the computer, cause the computer to generate one or more parameters from the model and solve the model so that the parameters equal values specified by the user, where one of the parameters is a covariance between returns of a pair of the plurality of securities.

112. The non-transitory computer-readable medium of claim 95, wherein the computer-executable instructions, upon execution by the computer, cause the computer to generate one or more parameters from the model and solve the model so that the parameters equal values specified by the user, where one of the parameters is a correlation between returns of one of the plurality of securities and returns of total assets of the firm.

113. The non-transitory computer-readable medium of claim 95, wherein the computer-executable instructions, upon execution by the computer, cause the computer to generate one or more parameters from the model and solve the model so that the parameters equal values specified by the user, where one of the parameters is a covariance between returns of one of the plurality of securities and returns of total assets of the firm.

114. The non-transitory computer-readable medium of claim 95, wherein the computer-executable instructions, upon execution by the computer, cause the computer to generate one or more parameters from the model and solve the model so that the parameters equal values specified by the user, where one of the parameters is an expected probability of default.

115. The non-transitory computer-readable medium of claim 95, wherein the computer-executable instructions, upon execution by the computer, cause the computer to generate one or more parameters from the model and solve the model so that the parameters equal values specified by the user, where one of the parameters is an expected loss given default on a debt-type security of the plurality of securities.

116. The non-transitory computer-readable medium of claim 95, wherein the computer-executable instructions, upon execution by the computer, cause the computer to generate one or more parameters from the model and solve the model so that the parameters equal values specified by the user, where one of the parameters is an expected default loss on a debt-type security of the plurality of securities.

117. The non-transitory computer-readable medium of claim 95, further bearing computer-executable instructions that, upon execution by the computer, cause the computer to perform operations comprising:
  receiving values for:
    a value of an equity of the firm at time n ($S_n$),
    a value of total assets of the firm at time n ($V_n$), wherein the value of total assets of the firm is a sum of values of a firm's debt ($B_n$) and equity ($S_n$),
    a face value (X) of the firm's debt (B), which is assumed to be a single zero-coupon bond, at maturity,
    a user selected time horizon, in years (T),
    a rate of return on the total assets of the firm, per annum ($r_V$),
    a rate of return on the firm's equity, per annum ($r_S$),
    a rate of return on the firm's debt, per annum ($r_B$),
    a standard deviation of rates of return on the total assets of the firm, per annum ($\sigma_V$),
  calculating a value for $d_1$, wherein:

$d_1 = ([\ln(V_0/X) + r_V T]/\sigma_V \sqrt{T}) + (1/2)(\sigma_V \sqrt{T})$, calculating a value for an instantaneous standard deviation of rates of return on the firm's debt, per annum ($\sigma_B$), using the formula:

$$\sigma_B = \sigma_V \frac{V_0}{B_0} e^{(r_V - r_B)T}[1 - N(d_1)]; \text{ and/or}$$

calculating a value for an instantaneous standard deviation of rates of return on the firm's equity, per annum ($\sigma_S$), using the formula:

$$\sigma_S = \sigma_V \frac{V_0}{S_0} e^{(r_V - r_S)T} N(d_1);$$

where N(•) is a cumulative probability of a standard normal distribution with $d_1$ as an upper limit; and
  using one or both said values of instantaneous standard deviation to fit the option-theoretic model of the firm.

118. The non-transitory computer-readable medium of claim 95, further bearing computer-executable instructions that, upon execution by the computer, cause the computer to perform operations comprising:
  receiving user selection of one or more of the following parameters, to be calculated over discrete time, for calibration with the model:
    a standard deviation of rates of return on a firm's debt, per annum ($\sigma_B$),
    a standard deviation of rates of return on a firm's equity, per annum ($\sigma_S$),
    a correlation of rates of return on the firm's debt and on the firm's equity ($\rho_{BS}$),
    a correlation of rates of return on total assets of the firm and on the firm's debt ($\rho_{VB}$),
    a correlation of rates of return on the total assets of the firm and on the firm's equity ($\rho_{VS}$),
    a covariance of rates of return on the firm's debt and on the firm's equity, per annum ($\sigma_{BS}$),
    a covariance of rates of return on the total assets of the firm and on the firm's debt, per annum ($\sigma_{VB}$),
    a covariance of rates of return on the total assets of the firm and on the firm's equity, per annum ($\sigma_{VS}$),
  calculating values for the one or more parameters so selected using one or more of the following formula:

$$\sigma_B = \sqrt{\ln\left(\frac{V_T^2[1 - N(d_3)]e^{\sigma_V^2 T} + X^2 N(d_2)}{B_T^2}\right)/T}$$

$$\sigma_S = \sqrt{\ln\left(\frac{V_T^2 N(d_3)e^{\sigma_V^2 T} - 2V_T X N(d_1) + X^2 N(d_2)}{S_T^2}\right)/T}$$

$$\rho_{BS} = \frac{X - B_T}{B_T \sqrt{(e^{\sigma_S^2 T} - 1)(e^{\sigma_B^2 T} - 1)}}$$

$$\rho_{VB} = \frac{V_T[1 - N(d_3)]e^{\sigma_V^2 T} + X N(d_1) - B_T}{B_T \sqrt{(e^{\sigma_V^2 T} - 1)(e^{\sigma_B^2 T} - 1)}}$$

$$\rho_{VS} = \frac{V_T N(d_3)e^{\sigma_V^2 T} - X N(d_1) - S_T}{S_T \sqrt{(e^{\sigma_V^2 T} - 1)(e^{\sigma_S^2 T} - 1)}}$$

$$\sigma_{BS} = \rho_{BS} \sigma_B \sigma_S$$

$$\sigma_{VB} = \rho_{VB} \sigma_V \sigma_B$$

$$\sigma_{VS} = \rho_{VS} \sigma_V \sigma_S$$

wherein:
  $S_n$ is a value of the equity of the firm at time n,
  $V_n$ is a value of the total assets of the firm at time n,
  $B_n$ is a value of the debt of the firm at time n,
  X is a face value of the firm's debt (B), which is assumed to be a single zero-coupon bond, at maturity,
  T is a user selected time horizon, in years,
  $r_V$ is a rate of return on the total assets of the firm, per annum,
  $\sigma_V$ is a standard deviation of rates of return on the total assets of the firm, per annum,
  $\sigma_S$ is a standard deviation of rates of return on the firm's equity, per annum,
  $\sigma_B$ is a standard deviation of rates of return on the firm's debt, per annum, values for $d_1$, $d_2$ and $d_3$ are calculated using the formula:

$d_1 = ([\ln(V_0/X) + r_V T]/\sigma_V \sqrt{T}) + (1/2)(\sigma_V \sqrt{T})$, $d_2 = d_1 - \sigma_V \sqrt{T}$, $d_3 = d_1 + \sigma_V \sqrt{T}$, N( ) is the cumulative probability of the standard normal distribution with $d_1$, $d_2$ or $d_3$ as the upper limit;

prior to calculating values of the selected parameter or parameters, receiving such of the following that are necessary to undertake the calculations using the formula:
the value of the equity of the firm at time n,
the value of the total assets of the firm at time n,
the value of the debt of the firm at time n,
the face value of the firm's debt,
the user selected time horizon, in years,
the rate of return on the total assets of the firm, per annum,
the standard deviation of rates of return on the total assets of the firm, per annum,
the standard deviation of rates of return on the firm's equity, per annum,
the standard deviation of rates of return on the firm's debt, per annum; and
using one or more of the values of the selected parameters so calculated to fit the option-theoretic model of the firm.

119. A non-transitory computer-readable medium for applying an option-theoretic model of a firm, storing computer-executable instructions that, upon execution by one or more computers, cause the one or more computers to perform operations comprising:
receiving one or more risk parameters, wherein the one or more risk parameters are related to the firm;
receiving one or more input parameters, wherein the one or more input parameters are to be used in the option-theoretic model of the firm;
receiving instructions on mathematical relationships between the input parameters, wherein the mathematical relationships are a set of one or more equations for execution by the one or more computers;
creating the option-theoretic model of the firm, based on the received instructions on mathematical relationships;
calculating, using the option-theoretic model, an estimated value for one or more of the risk parameters, measured over a discrete time period;
re-calculating, using the option-theoretic model, a solution, the solution comprising at least one estimated value for each of the one or more input parameters that a user allows to vary from the at least one received value, such that the at least one estimated risk parameter value from the model equals the at least one risk parameter value received by the one or more computers; and
storing the calculated option-theoretic model and the at least one estimated value of each of the one or more input parameters that the user allows to vary.

120. The non-transitory computer-readable medium of claim 119, wherein one of the risk parameters analysed by the computer-executable instructions is a statistical moment of returns of one or more securities issued by, or referenced to, the firm.

121. The non-transitory computer-readable medium of claim 119, wherein one of the risk parameters analysed by the computer-executable instructions is a correlation between returns of a pair of securities issued by, or referenced to, the firm.

122. The non-transitory computer-readable medium of claim 119, wherein one of the risk parameters analysed by the computer-executable instructions is a covariance between returns of a pair of securities issued by, or referenced to, the firm.

123. The non-transitory computer-readable medium of claim 119, wherein one of the risk parameters analysed by the computer-executable instructions is a correlation between returns of a security issued by, or referenced to, the firm and returns of total assets of the firm.

124. The non-transitory computer-readable medium of claim 119, wherein one of the risk parameters analysed by the computer-executable instructions is a covariance between returns of a security issued by, or referenced to, the firm and the returns of total assets of the firm.

125. The non-transitory computer-readable medium of claim 119, further bearing computer-executable instructions that, upon execution by the computer, cause the computer to perform operations comprising:
receiving values for:
a value of an equity of the firm at time n ($S_n$),
a value of total assets of the firm at time n ($V_n$), wherein the value of total assets of the firm is a sum of values of a firm's debt ($B_n$) and equity ($S_n$),
a face value (X) of the firm's debt (B), which is assumed to be a single zero-coupon bond, at maturity,
a user selected time horizon, in years (T),
a rate of return on the total assets of the firm, per annum ($r_V$),
a rate of return on the firm's equity, per annum ($r_S$),
a rate of return on the firm's debt, per annum ($r_B$),
a standard deviation of rates of return on the total assets of the firm, per annum ($\sigma_V$),
calculating a value for $d_1$, wherein:

$$d_1 = ([\ln(V_0/X) + r_V T]/\sigma_V \sqrt{T}) + (1/2)(\sigma_V \sqrt{T}),$$

calculating a value for an instantaneous standard deviation of rates of return on the firm's debt, per annum ($\sigma_B$), using the formula:

$$\sigma_B = \sigma_V \frac{V_0}{B_0} e^{(r_V - r_B)T} [1 - N(d_1)]; \text{ and/or}$$

calculating a value for an instantaneous standard deviation of rates of return on the firm's equity, per annum ($\sigma_S$), using the formula:

$$\sigma_S = \sigma_V \frac{V_0}{S_0} e^{(r_V - r_S)T} N(d_1);$$

where N(•) is a cumulative probability of a standard normal distribution with $d_1$ as an upper limit; and
using one or both said values of instantaneous standard deviation to fit the option-theoretic model of the firm.

126. The non-transitory computer-readable medium of claim 119, further bearing computer-executable instructions that, upon execution by the computer, cause the computer to perform operations comprising:
receiving user selection of one or more of the following parameters, to be calculated over discrete time, for calibration with the model:
a standard deviation of rates of return on a firm's debt, per annum ($\sigma_B$),
a standard deviation of rates of return on a firm's equity, per annum ($\sigma_S$),
a correlation of rates of return on the firm's debt and on the firm's equity ($\rho_{BS}$),
a correlation of rates of return on total assets of the firm and on the firm's debt ($\rho_{VB}$),
a correlation of rates of return on the total assets of the firm and on the firm's equity ($\rho_{VS}$), a covariance of rates of return on the firm's debt and on the firm's equity, per annum ($\sigma_{BS}$),
a covariance of rates of return on the total assets of the firm and on the firm's debt, per annum ($\sigma_{VB}$),
a covariance of rates of return on the total assets of the firm and on the firm's equity, per annum ($\sigma_{VS}$),
calculating values for the one or more parameters so selected using one or more of the following formula:

$$\sigma_B = \sqrt{\ln\left(\frac{V_T^2[1-N(d_3)]e^{\sigma_V^2 T} + X^2 N(d_2)}{B_T^2}\right)/T}$$

$$\sigma_S = \sqrt{\ln\left(\frac{V_T^2 N(d_3)e^{\sigma_V^2 T} - 2V_T X N(d_1) + X^2 N(d_2)}{S_T^2}\right)/T}$$

$$\rho_{BS} = \frac{X - B_T}{B_T\sqrt{(e^{\sigma_S^2 T} - 1)(e^{\sigma_B^2 T} - 1)}}$$

$$\rho_{VB} = \frac{V_T[1 - N(d_3)]e^{\sigma_V^2 T} + XN(d_1) - B_T}{B_T\sqrt{(e^{\sigma_V^2 T} - 1)(e^{\sigma_B^2 T} - 1)}}$$

$$\rho_{VS} = \frac{V_T N(d_3)e^{\sigma_V^2 T} - XN(d_1) - S_T}{S_T\sqrt{(e^{\sigma_V^2 T} - 1)(e^{\sigma_S^2 T} - 1)}}$$

$$\sigma_{BS} = \rho_{BS}\sigma_B\sigma_S$$

$$\sigma_{VB} = \rho_{VB}\sigma_V\sigma_B$$

$$\sigma_{VS} = \rho_{VS}\sigma_V\sigma_S$$

wherein:
$S_n$ is a value of the equity of the firm at time n,
$V_n$ is a value of the total assets of the firm at time n,
$B_n$ is a value of the debt of the firm at time n,
X is a face value of the firm's debt (B), which is assumed to be a single zero-coupon bond, at maturity,
T is a user selected time horizon, in years,
$r_V$ is a rate of return on the total assets of the firm, per annum,
$\sigma_V$ is a standard deviation of rates of return on the total assets of the firm, per annum,
$\sigma_S$ is a standard deviation of rates of return on the firm's equity, per annum,
$\sigma_B$ is a standard deviation of rates of return on the firm's debt, per annum, values for $d_1$, $d_2$ and $d_3$ are calculated using the formula:

$d_1 = ([\ln(V_0/X) + r_V T]/\sigma_V\sqrt{T}) + (1/2)(\sigma_V\sqrt{T})$, $d_2 = d_1 - \sigma_V\sqrt{T}$, $d_3 = d_1 + \sigma_V\sqrt{T}$, N( ) is the cumulative probability of the standard normal distribution with $d_1$, $d_2$ or $d_3$ as the upper limit;
prior to calculating values of the selected parameter or parameters, receiving such of the following that are necessary to undertake the calculations using the formula:
the value of the equity of the firm at time n,
the value of the total assets of the firm at time n,
the value of the debt of the firm at time n,
the face value of the firm's debt,
the user selected time horizon, in years,
the rate of return on the total assets of the firm, per annum,
the standard deviation of rates of return on the total assets of the firm, per annum,
the standard deviation of rates of return on the firm's equity, per annum,
the standard deviation of rates of return on the firm's debt, per annum; and
using one or more of the values of the selected parameters so calculated to fit the option-theoretic model of the firm.

* * * * *

UNITED STATES PATENT AND TRADEMARK OFFICE
CERTIFICATE OF CORRECTION

PATENT NO. : 8,359,252 B2  Page 1 of 1
APPLICATION NO. : 10/584826
DATED : January 22, 2013
INVENTOR(S) : John Michael Redmayne It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1674 days.

Signed and Sealed this
First Day of September, 2015

Michelle K. Lee
*Director of the United States Patent and Trademark Office*